(12) United States Patent
Ootsu et al.

(10) Patent No.: US 7,202,929 B2
(45) Date of Patent: Apr. 10, 2007

(54) DISPLAY DEVICE

(75) Inventors: Ryouichi Ootsu, Ichinomiya (JP);
Takanori Nakayama, Mobara (JP);
Takahiro Miyazaki, Chonan (JP)

(73) Assignee: Hitachi Displays, Ltd., Chiba-ken (JP)

( * ) Notice: Subject to any disclaimer, the term of this patent is extended or adjusted under 35 U.S.C. 154(b) by 0 days.

(21) Appl. No.: 10/838,848

(22) Filed: May 5, 2004

(65) Prior Publication Data
US 2004/0246425 A1  Dec. 9, 2004

(30) Foreign Application Priority Data
Jun. 5, 2003 (JP) ............................. 2003-160400

(51) Int. Cl.
G02F 1/333 (2006.01)
G02F 1/1343 (2006.01)

(52) U.S. Cl. ...................... 349/141; 349/110; 349/139; 349/142; 349/144

(58) Field of Classification Search ................ 349/141, 349/38, 139, 110, 142
See application file for complete search history.

(56) References Cited

U.S. PATENT DOCUMENTS

| 6,437,341 B1 | 8/2002 | Izumi et al. | |
| 6,781,659 B2 * | 8/2004 | Shiota et al. | 349/139 |
| 6,900,872 B2 * | 5/2005 | Kang | 349/141 |
| 6,924,864 B2 * | 8/2005 | Kim | 349/141 |
| 2002/0093614 A1 * | 7/2002 | Moon et al. | 349/141 |

FOREIGN PATENT DOCUMENTS

JP  11-125840  10/1997

* cited by examiner

*Primary Examiner*—Huyen Ngo
(74) *Attorney, Agent, or Firm*—Reed Smith LLP; Stanley P. Fisher, Esq.; Juan Carlos A. Marquez, Esq.

(57) ABSTRACT

In a liquid crystal display device, each pixel region formed over a liquid crystal side of one substrate out of respective substrates which are arranged to face each other with liquid crystal therebetween includes pixel electrodes to which a video signal is supplied from a drain signal line through a switching element driven in response to a scanning signal from a gate signal line and capacitive elements which are formed between the pixel electrodes and a capacitive signal line by way of a dielectric film. In such a constitution, the pixel region is divided into a plurality of regions, and video signals are supplied to respective pixel electrodes and capacitive elements in respective regions through paths which are branched from the switching element.

10 Claims, 26 Drawing Sheets

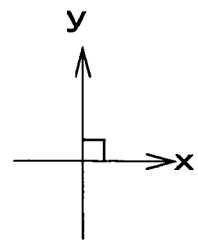
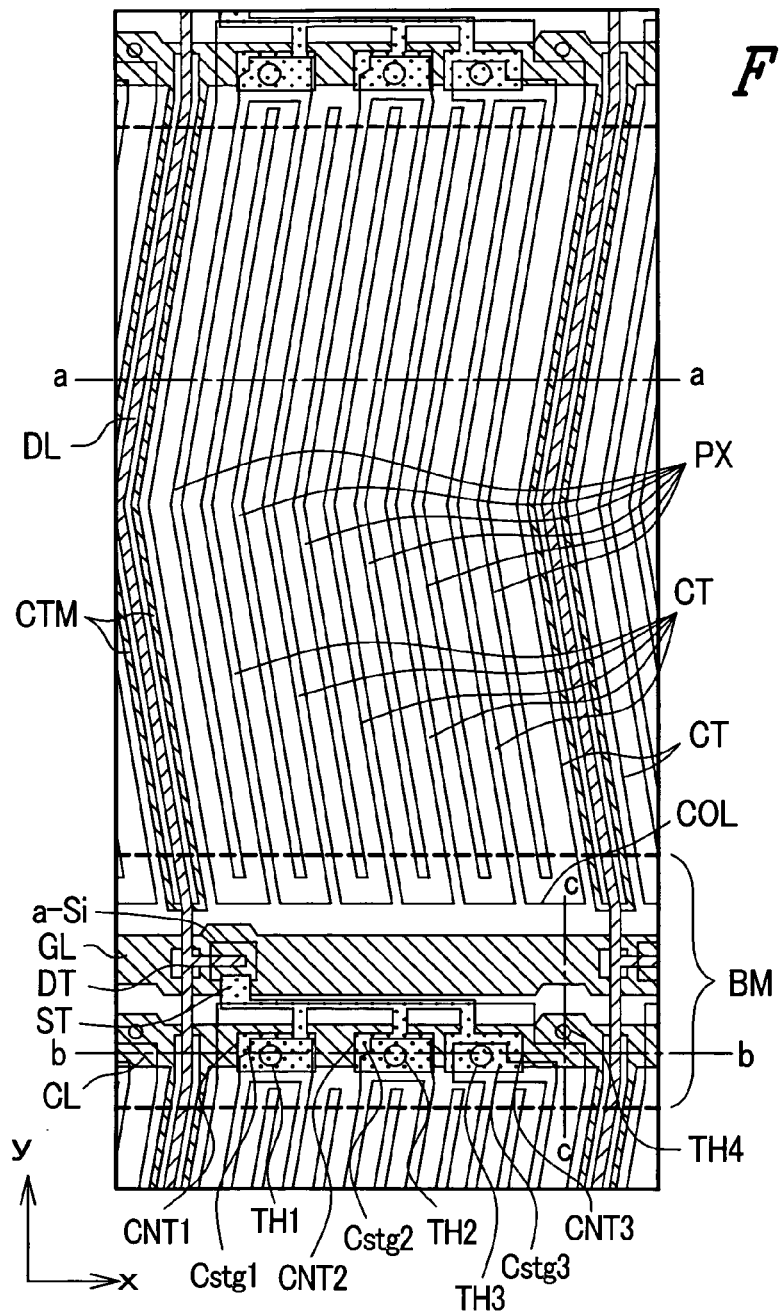
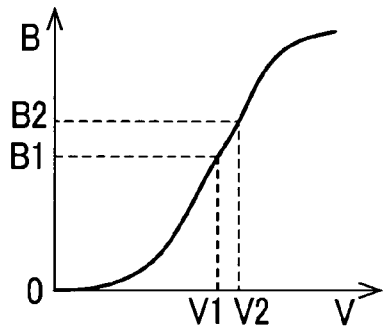

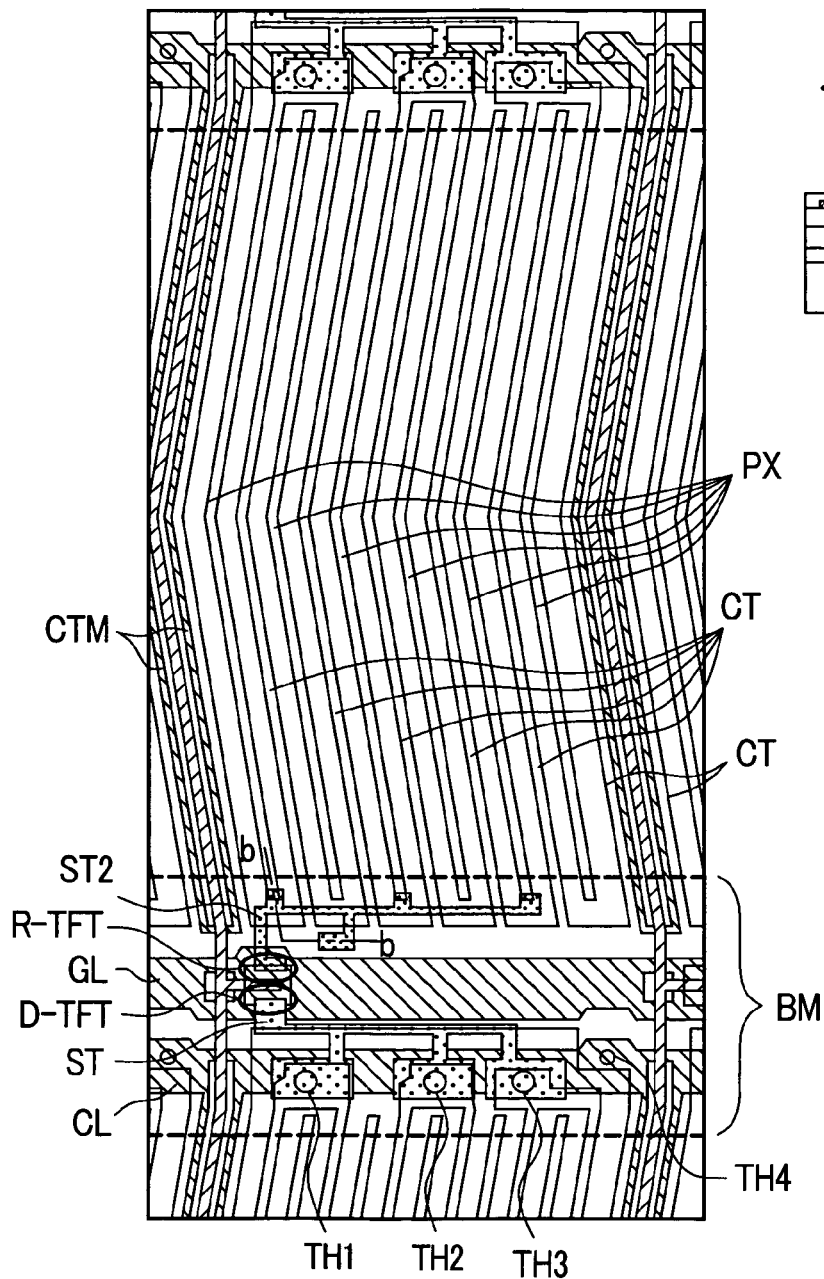
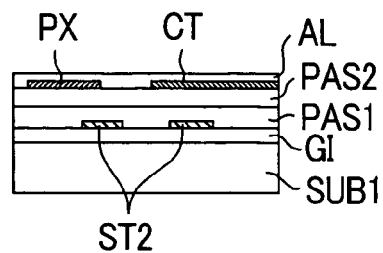
FIG. 8A
FIG. 8B

FIG. 14A
FIG. 14B
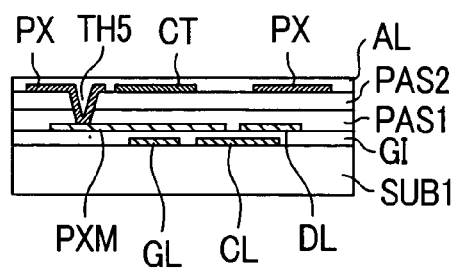
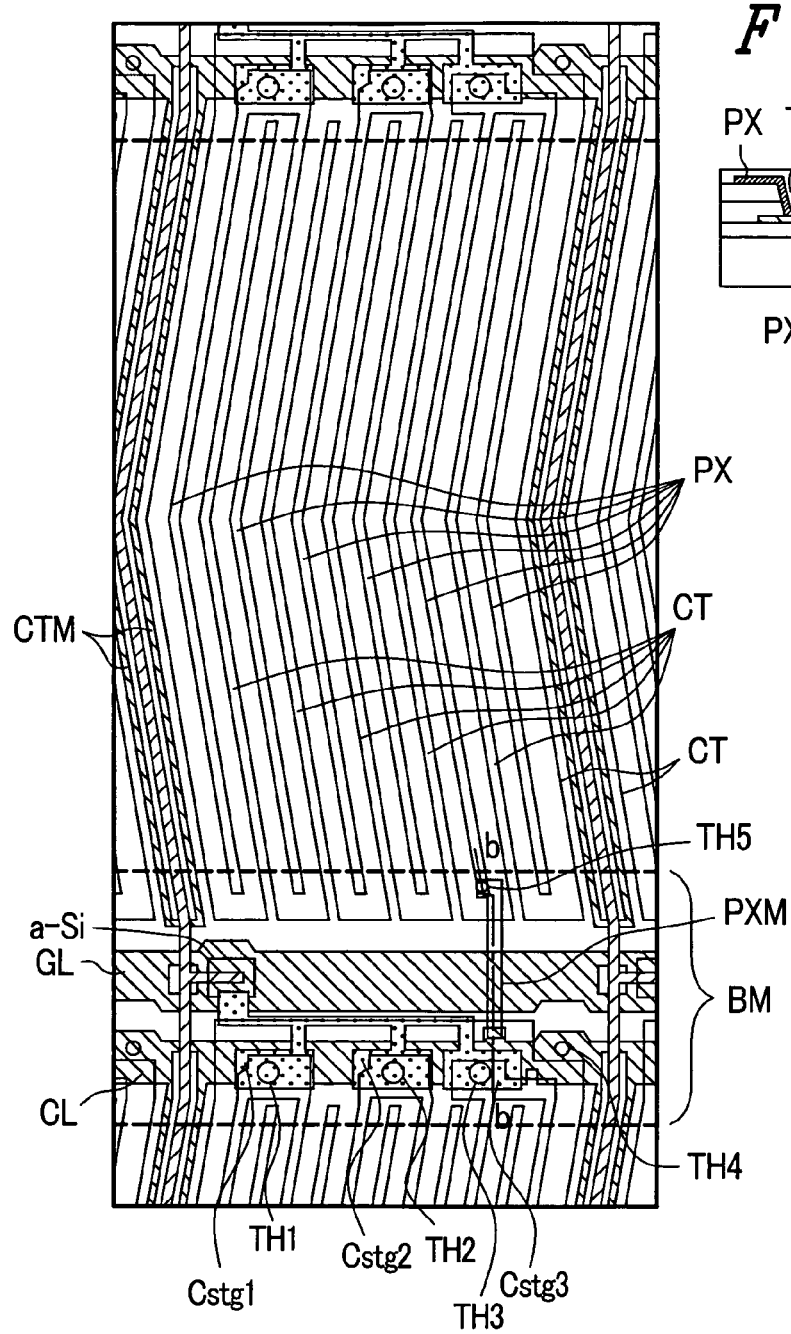

DISPLAY DEVICE

BACKGROUND OF THE INVENTION

1. Field of the Invention

The present invention relates to a display device, and more particularly to a liquid crystal display device having the constitution suitable for repairing point defects.

2. Description of the Related Art

A display device, for example, a liquid crystal display device is configured such that an envelope is formed by a pair of substrates which are arranged to face each other in an opposed manner with liquid crystal therebetween and a large number of pixels are formed in the spreading direction of the liquid crystal Each pixel includes an electronic circuit in which conductive layers, insulation layers, a semiconductor layer and the like which are finely formed by a photolithography technique are stacked on liquid-crystal-side surfaces of the respective substrates.

Accordingly, there exists a case that a so-called point defect (a defect of the pixel per se) occurs due to disconnection of the conductive layer or the like during manufacturing steps. There has been known a technique which repairs such a point defect, wherein by always performing a black display of the pixel.

SUMMARY OF THE INVENTION

However, recently, as in the case of a liquid crystal display device or the like for a TV set, when a size of one pixel is increased, the above-mentioned repairing is not sufficient and it has been pointed out that drawbacks attributed to the point defects are observed with naked eyes.

For example, a color liquid crystal display device is configured such that three pixels which are arranged close to each other are respectively allocated to red (R), green (G) and blue (B). Accordingly, for example, the respective pixels which are arranged in one direction are arranged from one side in order of . . . red (R), green (G), blue (B), red (R), green (G), blue (B), red (R), green (G), . . . . Here, when a defect occurs in one pixel which is allocated to the red color (R), for example, and a black display is performed to repair the defect, so-called cyan color which covers not only the repaired pixel but also extends over one or two pixels which are arranged at both sides of the repaired pixel is observed with naked eyes.

Accordingly, the conventional technique which merely performs the black display of one defective pixel is not sufficient and hence, there arises a strong demand for repairing which can minimize an area of a portion where the black display is performed.

The invention has been made in view of such circumstances and it is an advantage of the invention to provide a display device which can obviate a drawback attributed to a black display in repairing of a so-called point defect.

To briefly explain the summary of representative inventions among the inventions disclosed in this specification, they are as follows.

(1)

In a display device according to the invention in which, for example, each pixel region formed over a liquid crystal side of one substrate out of respective substrates which are arranged to face each other with liquid crystal therebetween includes a pixel electrode to which a video signal is supplied from a drain signal line through a switching element driven in response to a scanning signal from a gate signal line and a capacitive element which is formed between the pixel electrode and a capacitive signal line by way of a dielectric film, the pixel region is divided into a plurality of sections, each section includes the pixel electrode and the capacitive element, the respective pixel electrodes in the respective sections and the switching element are connected to each other through paths which are branched from the switching element.

(2)

The display device according to the invention is, for example, in the constitution (1), characterized in that the respective paths which are branched from the switching element have portions thereof overlapped with only an insulation film.

(3)

The display device according to the invention is, for example, in the constitution (2), characterized in that over a liquid-crystal-side surface of another substrate, a black matrix is formed such that the black matrix covers at least the portions of the respective paths which are branched from the switching element.

(4)

The display device according to the invention is, for example, in the constitution (1), characterized in that the display device is configured to be capable of supplying by repairing a video signal from the switching element to a pixel electrode of another pixel region which is arranged along and close to the drain signal line with respect to the pixel region.

(5)

The display device according to the invention is, for example, in the constitution (4), characterized in that a portion of a wiring layer to which the video signal is supplied from the switching element is formed to be overlapped to a portion of the pixel electrode of another pixel region which is arranged along and close to the drain signal line with respect to the pixel region by way of an insulation film.

(6)

The display device according to the invention is, for example, in the constitution (1), characterized in that the capacitive element is overlapped to a capacitive signal line and the capacitive signal line constitutes one electrode of the capacitive element.

(7)

The display device according to the invention is, for example, in the constitution (1), characterized in that the pixel electrode is constituted of a group formed of a plurality of strip-like electrodes which extend in one direction and, at the same time, a counter electrode which generates an electric field between the counter electrode and each pixel electrode is constituted of a group formed of a plurality of strip-like electrodes which are arranged with each pixel electrode therebetween and extend in one direction at one substrate side.

(8)

In a display device according to the invention in which, for example, each pixel region formed over a liquid crystal side of one substrate out of respective substrates which are arranged to face each other with liquid crystal therebetween includes a pixel electrode to which a video signal is supplied from a drain signal line through a switching element driven in response to a scanning signal from a gate signal line and a capacitive element which corresponds to the pixel electrode, the pixel electrode is divided into a plurality of pixel electrodes, the capacitive element is provided for each divided pixel electrode, and the pixel electrodes and the switching element are connected to each other through paths which are branched from the switching element for respective pixel electrodes.

(9)

The display device according to the invention is, for example, in the constitution (8), characterized in that a light shielding film which blocks divided portions of the respective divided pixel electrodes is formed over one substrate side.

(10)

The display device according to the invention is, for example, in the constitution (9), characterized in that the capacitive element is overlapped to a capacitive signal line, the capacitive signal line constitutes one electrode of the capacitive element, and an extended portion of the capacitive signal line constitutes the light shielding film.

(11)

The display device according to the invention is, for example, in the constitution (1), characterized in that the liquid crystal display device is a normally black type liquid crystal display device.

(12)

The display device according to the invention is, for example, in the constitution (8), characterized in that the liquid crystal display device is a normally black type liquid crystal display device.

(13)

The display device according to the invention is, for example, in the constitution (11), characterized in that the display device includes the structure in which upon cutting the branched paths, the switching element and the pixel electrode are separated from each other and, at the same time, the capacitive element and the switching element are separated from each other.

(14)

The display device according to the invention is, for example, in the constitution (12), characterized in that the display device includes the structure in which upon cutting the branched paths, the switching element and the pixel electrode are separated from each other and, at the same time, the capacitive element and the switching element are separated from each other.

(15)

In a display device according to the invention in which, for example, each pixel region formed over a liquid crystal side of one substrate out of respective substrates which are arranged to face each other with liquid crystal therebetween includes a pixel electrode to which a video signal is supplied from a drain signal line through a switching element driven in response to a scanning signal from a gate signal line, the pixel electrode is divided into a plurality of pixel electrodes, the capacitive element is provided for each divided pixel electrode, and the pixel electrodes and the switching element are connected to each other through paths which are branched from the switching element, and the counter electrode is also divided into a plurality of counter electrodes in each pixel region and the divided counter electrodes are arranged in the direction of the dividing direction of the pixel electrode such that the divided counter electrodes are displaced from the division of the pixel electrode.

(16)

In a display device according to the invention in which, for example, each pixel region formed over a liquid crystal side of one substrate out of respective substrates which are arranged to face each other with liquid crystal therebetween includes a pixel electrode to which a video signal is supplied from a drain signal line through a switching element driven in response to a scanning signal from a gate signal line and a capacitive element which corresponds to the pixel electrode, the pixel region is divided into a plurality of sections, and to the respective pixel electrodes and the respective capacitive elements in the respective sections, the video signal is supplied through paths which are branched from the switching element.

Here, the invention is not limited to the above-mentioned constitutions and various modifications can be made without departing from the technical concept of the invention.

BRIEF DESCRIPTION OF THE DRAWINGS

FIG. 1A is a plan view showing one embodiment of a pixel of a display device according to the invention and FIGS. 1B and 1C are figures for explanation;

FIG. 8A is a plan view showing another embodiment of the pixel of the display device according to the invention and FIG. 8B is cross section view of part of FIG. 8A;

FIGS. 14A and 14B are constitutional view showing another embodiment of a pixel of a liquid crystal display device according to the invention;

FIGS. 21A and FIG. 21B are views showing another embodiment of the pixel of the display device according to the invention, wherein FIG. 21A is a plan view and FIG. 21B is a cross-sectional view;

DESCRIPTION OF THE PREFERRED EMBODIMENTS

Preferred embodiments of a liquid crystal display device according to the invention are explained hereinafter in detail in conjunction with drawings.

Embodiment 1

Figure 2A:
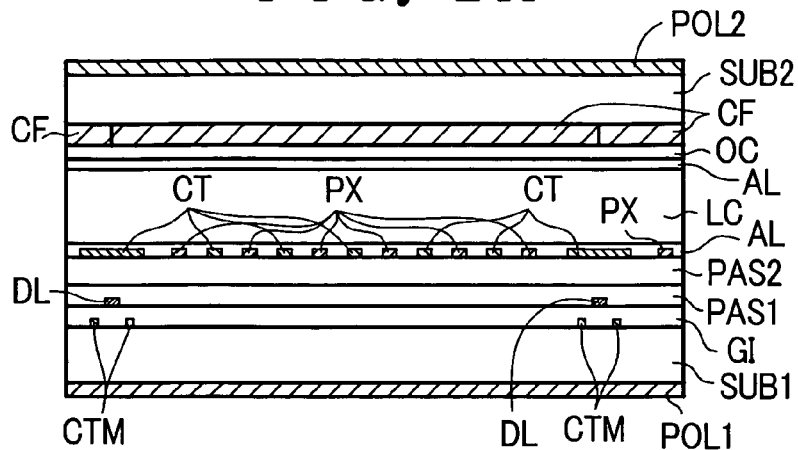
FIG. 2A to 2C are view showing a cross-section of an essential part in FIG. 1.
Figure 2B:
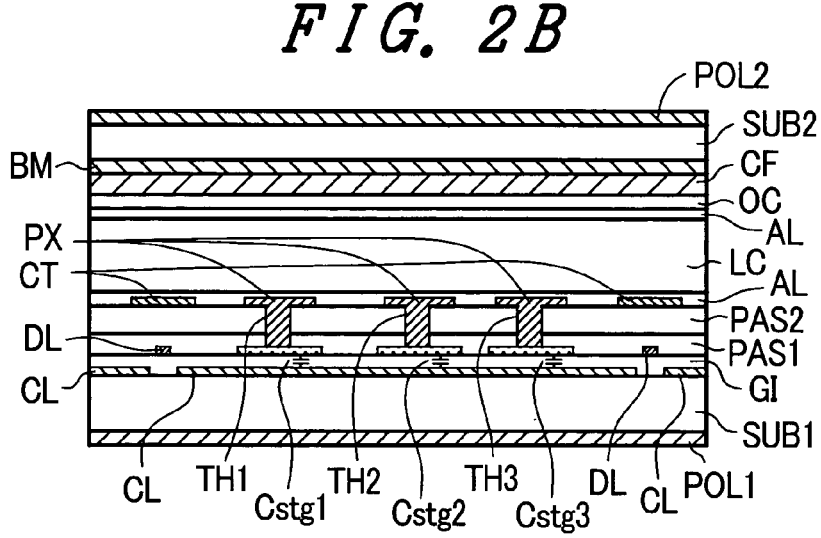
Figure 2C:
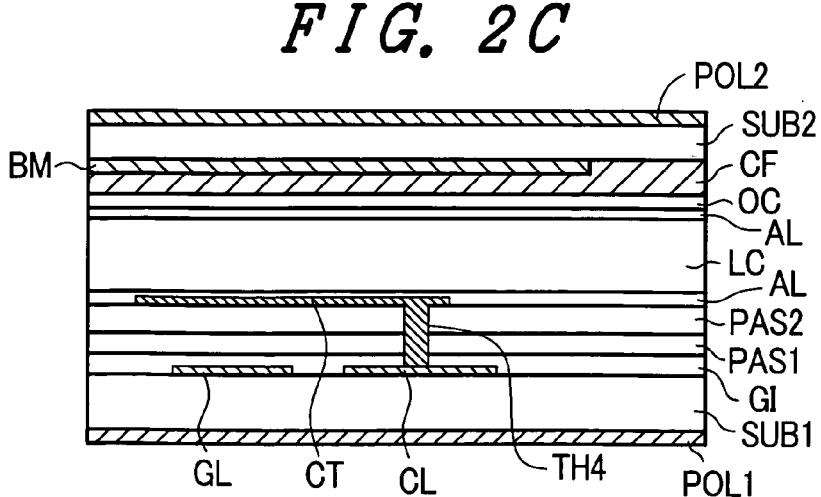

FIG. 1A is a plan view showing the constitution of a pixel of a liquid crystal display device according to the invention. Further, FIG. 2A is a cross-sectional view taken along a line a—a in FIG. 1A, FIG. 2B is a cross-sectional view taken along a line b—b in FIG. 1B and FIG. 2C is a cross-sectional view taken along a line c—c in FIG. 1A.

The respective pixels of the liquid crystal display device according to the invention are arranged in a matrix array and respective pixels which are arranged above and below as wells as at left and right sides of the pixel shown in FIG. 1A have the substantially same constitution.

In FIG. 1A, on a liquid-crystal-side surface of a transparent substrate SUB1 (see FIG. 2), first of all, gate signal lines GL which extend in the x direction and are arranged in parallel in the y direction are formed (only one gate signal line GL shown in FIG. 1).

These gate signal lines GL surround a rectangular region together with drain signal lines DL described later and this region constitutes a pixel region. A mass of these pixel regions constitute a liquid crystal display region.

Further, in a region which is defined between the respective gate signal lines GL, a capacitive signal line CL is formed in a state that the capacitive signal line CL is arranged close to the gate signal line GL disposed at a lower side in the drawing and parallel to the gate signal line GL. The gate signal lines GL and the capacitive signal lines CL are, for example, formed of a same material and is manufactured in a same step.

Here, the capacitive signal line CL is formed in a pattern in which a pair of branched signal lines CTM extend downwardly in the drawing along both sides of a region where the drain signal line DL described later is formed and are connected to each other in the vicinity of the gate signal line GL. In other words, the drain signal line DL is formed in the inside of the pixel region such that the drain signal line DL is surrounded by the capacitive signal lines CL. This constitution is provided for enabling an electric field from the drain signal line DL to easily terminate at the branched signal lines CTM of the capacitive signal line CL which are formed at both sides of the drain electrode DL thus preventing the electric field from terminating at pixel electrodes PX described later. When the electric field generated from the drain signal line DL terminates at the pixel electrodes PX, the electric field functions as noises.

Further, over the surface of the transparent substrate SUB1, a first insulation film GI is formed such that the first insulation film GI also covers the gate signal lines GL and the capacitive signal lines CL. The first insulation film GL functions as a gate insulation film of a thin film transistor TFT explained later and, at the same time, functions as an interlayer insulation film of the drain signal lines DL described later with respect to the gate signal lines GL and the capacitive signal lines CL.

Then, over a surface of the first insulation film GI, semiconductor layers a-Si made of amorphous Si, for example, are formed such that the semiconductor layers a-Si are overlapped to some regions of the gate signal lines GL.

Each semiconductor layer a-Si constitutes a semiconductor layer of the thin film transistor TFT. By forming a drain electrode DT and a source electrode ST on an upper surface of the thin film transistor TFT, it is possible to form a MIS transistor having the inverse staggered structure which uses a portion of the gate signal lines GL as a gate electrode.

Here, the drain electrode DT and the source electrode ST are formed simultaneously at the time of forming the drain signal lines DL.

That is, the drain signal lines DL which extend in the y direction and are arranged in parallel in the x direction are formed, wherein portions of the drain signal lines DL extend above upper surfaces of the semiconductor layers a-Si to form drain electrodes DT. Further, source electrodes ST are formed in a spaced-apart manner from the drain electrodes DT by a distance corresponding to a length of channel of the thin film transistor TFT.

The source electrode ST slightly extends to an upper portion of the capacitive signal line CL at a pixel region (pixel region at a lower side in the drawing) side from a surface of the semiconductor layer a-Si. This extended portion of the source electrode ST forms a contact portion for establishing the connection between the source electrode ST and the pixel electrodes PX described later.

Here, the contact portion has a relatively large area and three contact portions are formed, for example. These respective contact portions CNT1, CNT2, CNT3 are arranged in parallel over the above-mentioned capacitive signal line CL.

By arranging the respective contact portions CNT1, CNT2, CNT3 over the above-mentioned capacitive signal line CL, capacitive elements Cstg1, Cstg2, Cstg3 which use the first insulation film GI as dielectric films can be formed therebetween. These capacitive elements Cstg1, Cstg2, Cstg3 are respectively given a function of storing the video signal supplied to the pixel electrodes PX in the pixel electrodes PX for a relatively long time and the like.

Over the surface of the transparent substrate SUB1 over which the thin film transistor TFT, the drain signal lines DL, the drain electrodes DT and the source electrodes ST are formed in this manner, a protective film PAS1 which is formed of SiN, for example, and a protective film PAS2 which is formed of resin, for example, are formed. These protective films PAS1, PAS2 are films provided for obviating a direct contact of the thin film transistors TFT with the liquid crystal and can prevent the degeneration of characteristics of the thin film transistors TFT. Further, resin is used as a material of the protective film PAS2 for reducing a total dielectric constant of the protective films PAS1, PAS2 and for leveling the surface.

Further, the pixel electrodes PX are formed over an upper surface of the protective film PAS2. The pixel electrodes PX are constituted of a group of, for example, six electrodes which extend in the y direction and are arranged in parallel in the x direction. Among these respective pixel electrodes PX, every two neighboring pixel electrodes PX form a group and the pixel electrodes PX of each group is electrically connected with the contact portion via a through hole TH which penetrates the protective films PAS2, PAS1 over one contact portion arranged close to the pixel electrodes among the above-mentioned contact portions CNT.

That is, among the respective pixel electrodes PX which are arranged in the pixel, two pixel electrodes PX from the left side in the drawing are connected with the contact portion CNT1 which forms the capacitive element Cstg1 between the contact portion CNT1 and the capacitive signal line CL via a through hole TH1 and is connected with the source electrode ST of the above-mentioned thin film transistor TFT. Further, two pixel electrodes PX at the further right side in the drawing are connected with the contact portion CNT2 which forms the capacitive element Cstg2 between the contact portion CNT2 and the capacitive signal line CL via a through hole TH2 and is connected with the source electrode ST of the above-mentioned thin film transistor TFT. Further, two pixel electrodes PX at the still further right side in the drawing are connected with the contact portion CNT3 which forms the capacitive element Cstg3 between the contact portion CNT3 and the capacitive signal line CL via a through hole TH3 and is connected with the source electrode ST of the above-mentioned thin film transistor TFT.

Over a surface of the protective film PAS2 over which the pixel electrodes PX are formed over in this manner, counter electrodes CT are also formed. Any conductive material may be used as a material of the counter electrodes CT. In this embodiment, the counter electrodes CT is made of a light transmitting material such as ITO (Indium Tin Oxide), ITZO (Indium Tin Zinc Oxide), IZO (Indium Zinc Oxide), $SnO_2$ (tinoxide), $In_2O_3$ (indium oxide), for example. The light transmitting material is used for enhancing a so-called numerical aperture of the pixel.

The counter electrodes CT are constituted of a group of seven electrodes which extend in the y direction in the drawing parallel to the respective pixel electrodes PX at both sides of each pixel electrode PX which extends in the y direction in the drawing.

Among these counter electrodes CT, two counter electrodes CT are formed as electrodes having a line width which allows each counter electrode CT to sufficiently cover the drain signal line DL and the branched signal lines CTM of the capacitive signal lines CL arranged at both sides of the drain signal line DL. This constitution is provided for making an electric field generated from the drain signal lines DL easily terminate at the counter electrode CT formed above the drain electrode DL.

Further, a material layer which constitutes the counter electrodes CT is formed to sufficiently cover also the gate signal line GL while avoiding regions where the above-mentioned capacitive elements Cstg1, Cstg2, Cstg3 are formed in a state that the counter electrodes CT are connected to each other. This constitution is also provided for making an electric field generated from the gate signal line GL terminate at the material layer (counter voltage signal line COL). Here, the material layer is connected with the capacitive signal line CL via a through hole TH4 which penetrates the protective film PAS2, the protective film PAS1 and the first insulation film GI. This constitution is provided for making a potential of the capacitive signal line CL and a potential of the counter electrode CT equal.

Accordingly, the above-mentioned material layer which sufficiently covers the gate signal line GL and is held at the same potential as the counter electrode CT obtains the function of the counter voltage signal line COL which supplies signals to the counter electrode CT.

The pixel electrodes PX and the counter electrodes CT which are constituted in the above-mentioned manner are arranged at an equal interval from the one-side drain signal line DL to the another side drain signal line DL in order of the counter electrode CT, the pixel electrode PX, the counter electrode CT, the pixel electrode PX, . . . , the counter electrode CT. Between the pixel electrode PX and the counter electrode CT which are arranged close to each other, an electric field having components substantially parallel to the surface of the transparent substrate SUB1 is generated and the behavior of the liquid crystal is initiated by the electric field whereby the optical transmissivity of the liquid crystal is controlled.

Here, in this embodiment, the pixel electrodes PX and the counter electrodes CT are formed in a pattern that these electrodes are bent using the substantially center of the pixel region as a boundary. Accordingly, the drain signal line DL and the branched signal lines CTM (capacitive signal lines CL) which are arranged at both sides of the drain signal line DL are also formed in a bent pattern. In this manner, this embodiment adopts a so-called multi-domain method. That is, liquid crystal changes the polarization state of transmitting light in response to the incident direction of the light incident on a liquid crystal display device even in a state that the liquid crystal has the same molecular orientation and hence, the optical transmissivity differs corresponding to the incident direction. Such viewing angle dependency of the liquid crystal display device induces a reverse phenomenon of brightness when a viewing point is inclined obliquely with respect to the viewing angle direction and hence, it gives rise to the display characteristics that images are colored in color display. Accordingly, the pixel electrodes PX are formed in the pattern in which at least one bent portion is formed over each pixel electrode PX in the extending direction of the pixel electrode PX, the counter electrodes CT are formed in a state that the pattern of the pixel electrodes PX is shifted in parallel, and the direction of the electric field which acts between the respective electrodes is made different from each other between one region and another region which use an imaginary line connecting bent portions of respective electrodes as boundaries whereby the coloring of the images attributed to the viewing angle can be compensated.

Over an upper surface of the protective film PAS2 over which the pixel electrodes PX, the counter electrodes CT and the like are formed, an orientation film AL is formed such that the orientation film AL also covers the pixel electrodes PX, the counter electrodes CT and the like. The orientation film AL is a film which determines the initial orientation direction of the liquid crystal with which the orientation film AL is arranged to be in contact.

Here, over a liquid-crystal-side surface of the transparent substrate SUB2 which is arranged to face the transparent substrate SUB1 having such a constitution in an opposed manner with the liquid crystal therebetween, as shown in FIG. 2, color filters CF, a black matrix BM, a leveling film OC and an orientation film AL are formed. The black matrix BM is formed in a pattern in which strips extend in the x direction in the drawing so as to sufficiently cover the gate signal lines GL and the capacitive signal lines CL, wherein respective distal ends of the pixel electrodes PX and the counter electrodes CT cannot be observed with naked eyes due to the presence of the black matrix.

Here, the above-mentioned liquid crystal is used in a so-called normally black mode. That is, when the electric field is not generated between the pixel electrode PX and the counter electrode CT, a black display is performed, while when the electric field is generated between the pixel electrode PX and the counter electrode CT, the display mode is shifted from the black display to a white display in accordance with a field strength of the electric field.

Further, to surfaces of the respective transparent substrates SUB1 and SUB2 at sides opposite to the liquid crystal, polarizers POL1, POL2 are laminated so as to enable visualizing of the behavior of the liquid crystal. As shown in FIG. 1B, this embodiment is configured such that a polarized light transmitting axis of the polarizer POL1 of one transparent substrate, for example, the transparent substrate SUB1 is aligned with the y direction and a polarized light transmitting axis of the polarizer POL2 of the transparent substrate SUB2 is aligned with the x direction.

In the liquid crystal display device having such a constitution, one pixel region is divided into three regions, a video signal from one thin film transistor TFT provided to the pixel is branched into three signals and these signals are supplied to the pixel electrodes PX of the respective regions and, at the same time, the capacitive elements are provided to the respective regions for storing the video signals.

Figure 3:
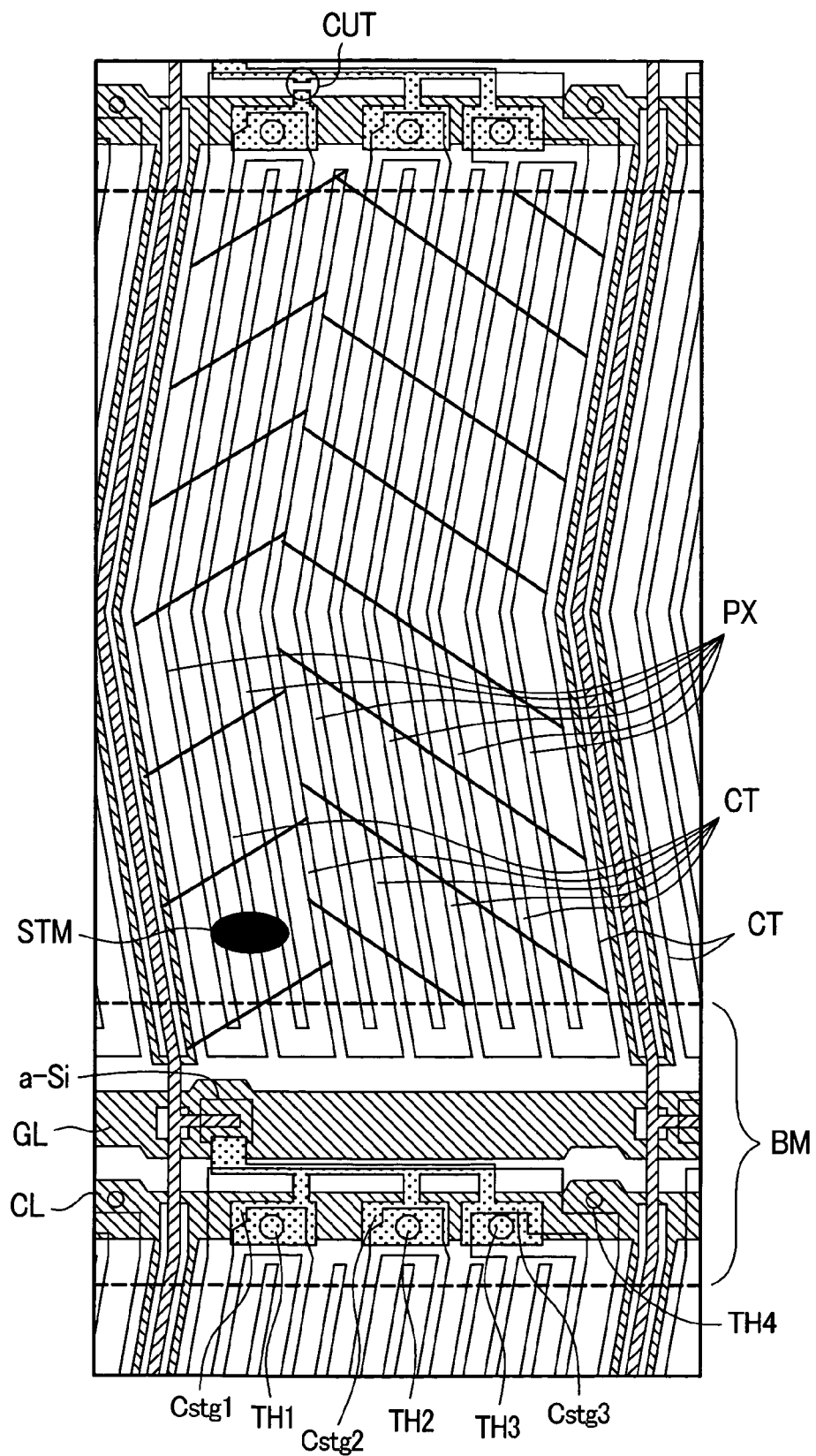
FIG. 3 is a view showing a mode of repairing a pixel defect of the display device shown in FIG. 1.

Accordingly, as shown in FIG. 3, when a foreign material STM remains at a portion of the pixel region and a short-circuiting is generated between the pixel electrode PX and the counter electrode CT due to the foreign material STM, a connecting portion between the pixel electrode PX with the source electrode ST of the thin film transistor TFT, to be more specific, a connecting portion between the capacitive element Cstg (the capacitive element Cstg1 in the drawing, for example) formed by the pixel electrode PX and the source electrode ST of the thin film transistor TFT is cut by irradiating laser beams thus forming a cut portion CUT.

Accordingly, although the black display is performed at ⅓ of the pixel region after repairing, the function of the pixel is restored with respect to the remaining ⅔ of the pixel region.

Further, along with such cutting of the connecting portion, the capacitances of the capacitive element Cstg and the liquid crystal are also separated with respect to the thin film transistor TFT. This implies that, for the thin film transistor TFT, the capacitance to which the signal is to be written becomes the capacitive elements Cstg of the remaining region and the capacitance of the liquid crystal and hence, the capacitance becomes small or light. As a result, it is possible to have an advantage that when the defect correction is performed, the writing characteristics of the thin film transistor TFT with respect to the pixel is enhanced and signals having a voltage higher than other pixels are written.

In the normally black display, this implies that the brightness in a periphery of a sub region with respect to the same video signal voltage is enhanced in the pixel compared to other normal pixels. Accordingly, this gives rise to a region which is not operable in the inside of the pixel by the defect correction. However, in other regions, the brightness in an intermediate tone is enhanced compared to the brightness before repairing and hence, lowering of the brightness attributed to the reduction of the operable region can be compensated to some extent. That is, lowering of the brightness of the whole pixel attributed to the defect correction can be suppressed and hence, it is possible to perform the defect correction in a wider area whereby a yield rate can be dramatically enhanced.

Here, FIG. 1C is a characteristic graph of the brightness of the liquid crystal with respect to an electric field (voltage) applied to the liquid crystal. As shown in the drawing, in an intermediate tone where a decoloring brightness point causes a problem particularly, before repairing, the brightness per a unit area of the sub region where short-circuiting is not generated exhibits the brightness B1 with a writing voltage V1. After repairing, the capacitance to be written in the thin film transistor TFT is reduced and hence, the brightness per a unit area is increased to the brightness B2 with a writing voltage V2 after repairing. Accordingly, at the time of correcting the decoloring brightness point by the defect correction, lowering of the brightness of the pixel in which the defect is generated can be suppressed and hence, the correction ratio can be largely enhanced.

Here, the above-mentioned embodiment is directed to the constitution in which three capacitive elements Cstg are provided and two pixel electrodes PX are allocated to each capacitive element Cstg. However, the number of the capacitive elements Cstg is not limited. That is, the number of the capacitive elements Cstg may be three or more. Further, the number of the pixel electrodes PX which are allocated to each capacitive element Cstg may be arbitrarily selected. In this embodiment, in view of realizing the reduction of the number of the through holes TH, it is preferable to set the number of the pixel electrodes PX allocated to one capacitive element Cstg to a plural number.

Embodiment 2

Figure 4:
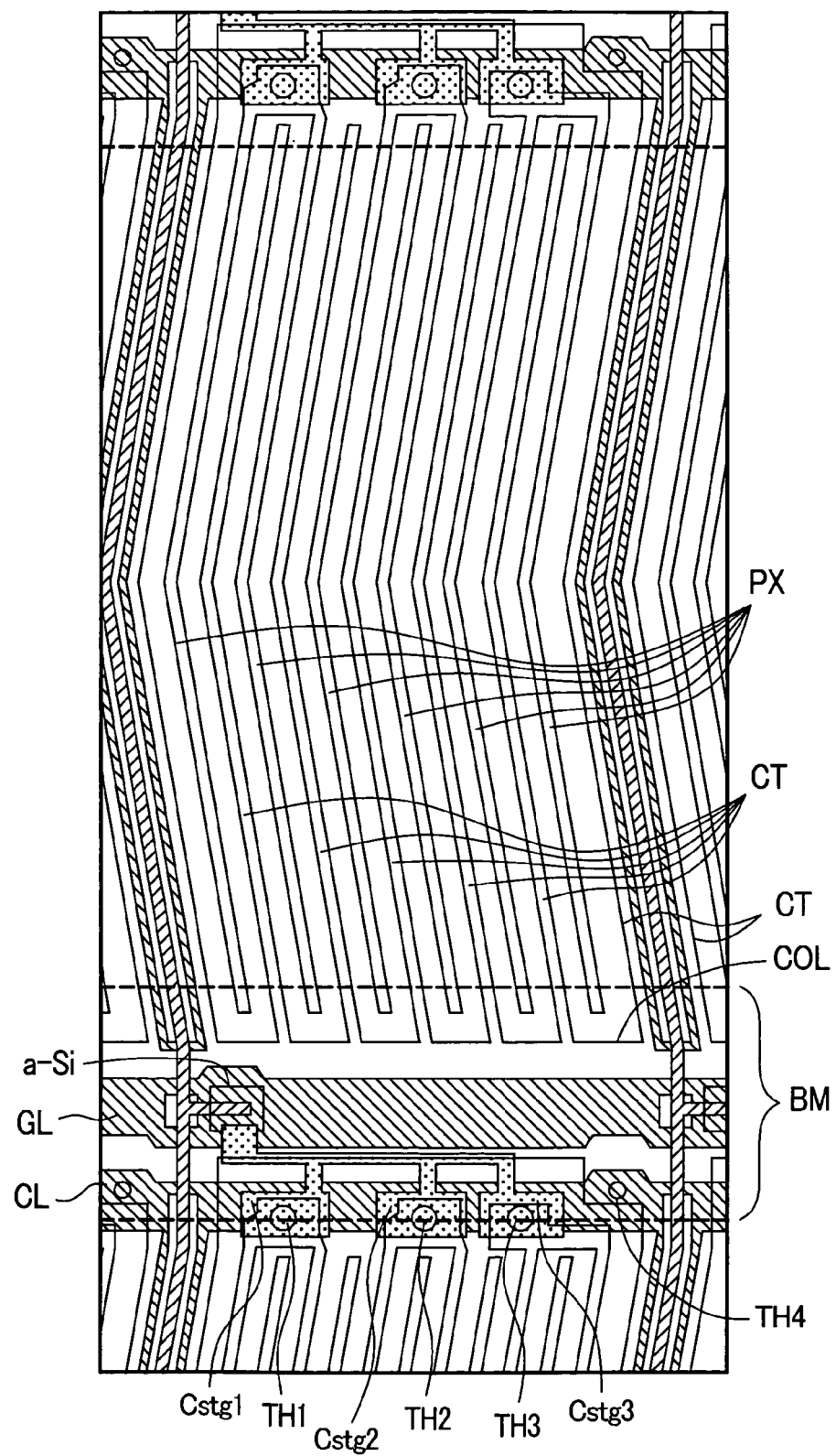
FIG. 4 is a plan view showing another embodiment of the pixel of the display device according to the invention.

FIG. 4 is a plan view showing another embodiment of the liquid crystal display device according to the invention and corresponds to FIG. 1A.

The constitution which makes this embodiment different from the embodiment shown in FIG. 1A lies in the arrangement position of the black matrix BM. The black matrix BM which is arranged in parallel to the extending direction of the gate signal line GL is formed such that the black matrix BM sufficiently covers the gate signal line GL. However, at a capacitive signal line CL side of the black matrix BM, a portion of the capacitive signal line CL is exposed from the side. In other words, the side is positioned to be overlapped to the capacitive signal line CL.

The constitution is provided in view of a fact that, while a so-called domain is easily generated between the gate signal line GL and the pixel electrode PX, the domain is hardly generated between the capacitive signal line CL and the pixel electrode PX. Accordingly, a so-called numerical aperture of the pixel can be enhanced.

Here, in the same manner as the constitution shown in the embodiment 1, in this embodiment 2, the region defined between the gate signal line GL and the capacitive signal line CL arranged close to the gate signal line GL is covered with the above-mentioned black matrix BM. This is because that the region corresponds to the position where the source electrode ST of the thin film transistor TFT and the pixel electrode PX which is connected to the source electrode ST are separated from each other by the irradiation of laser beams or the like, for example, at the time of repairing and hence, it is necessary to conceal the degeneration or the discoloring of the color filter CF caused by the irradiation of laser beams with the black matrix BM.

Embodiment 3

Figure 5:
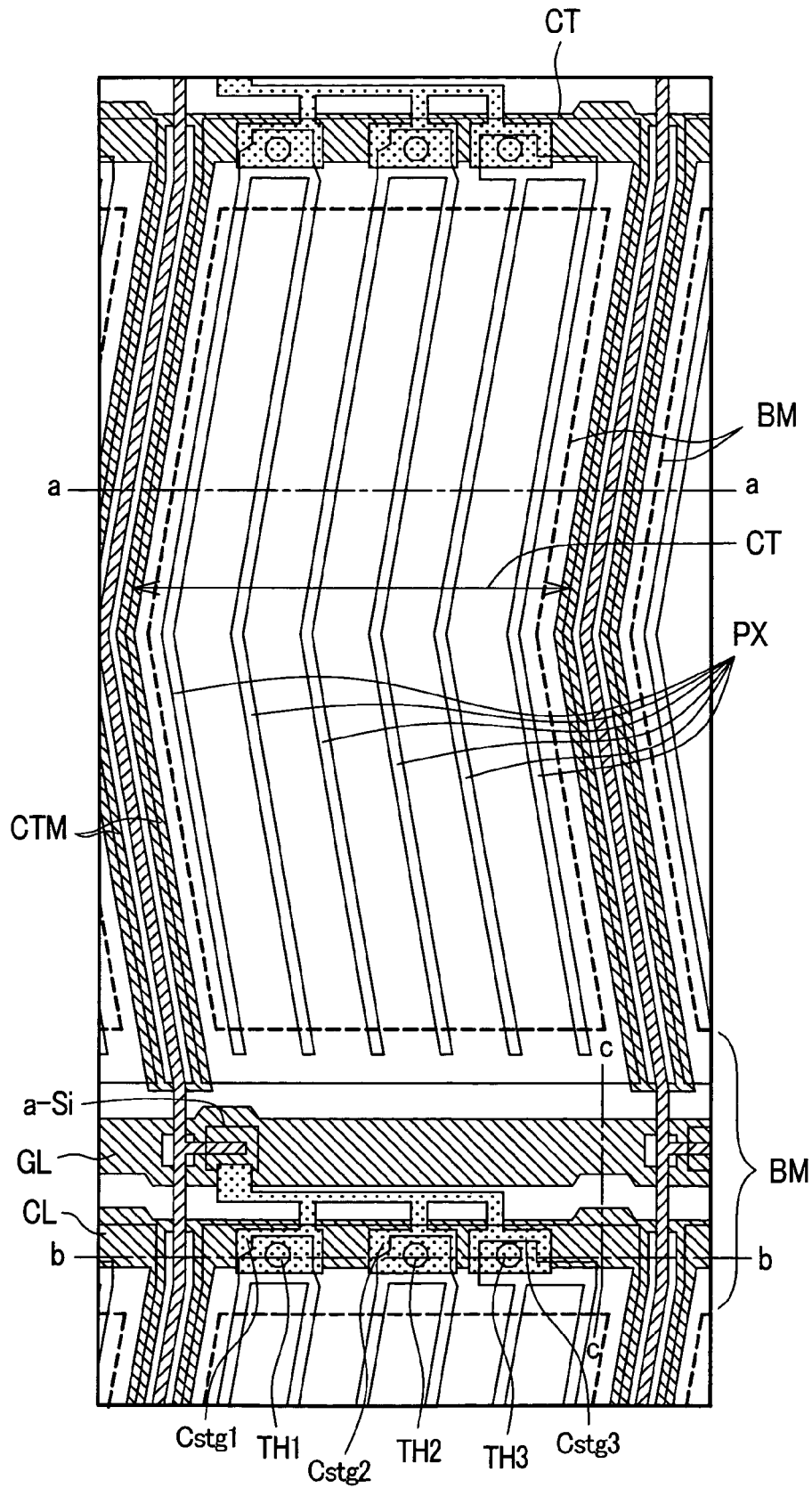
FIG. 5 is a plan view showing another embodiment of the pixel of the display device according to the invention.
Figure 6A:
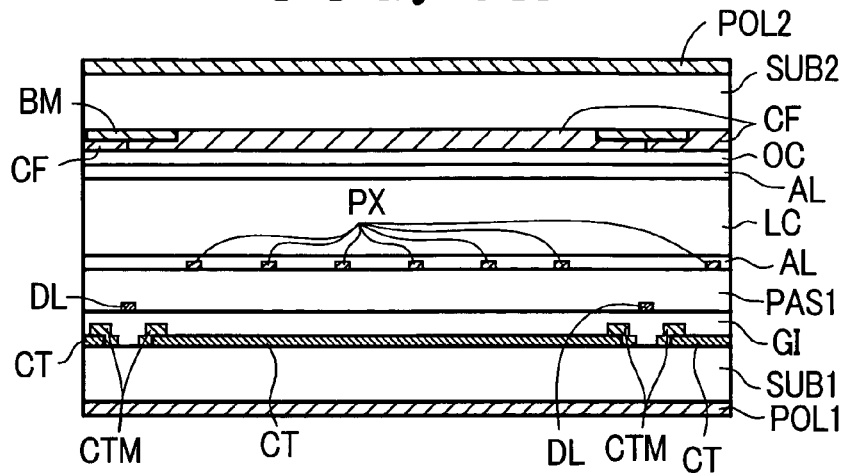
FIG. 6A to 6C are view showing across section of an essential part in FIG. 5.
Figure 6B:
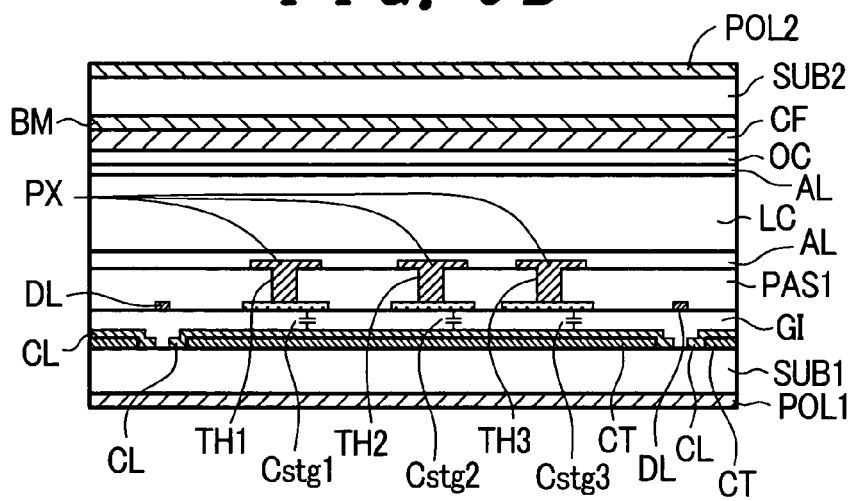
Figure 6C:
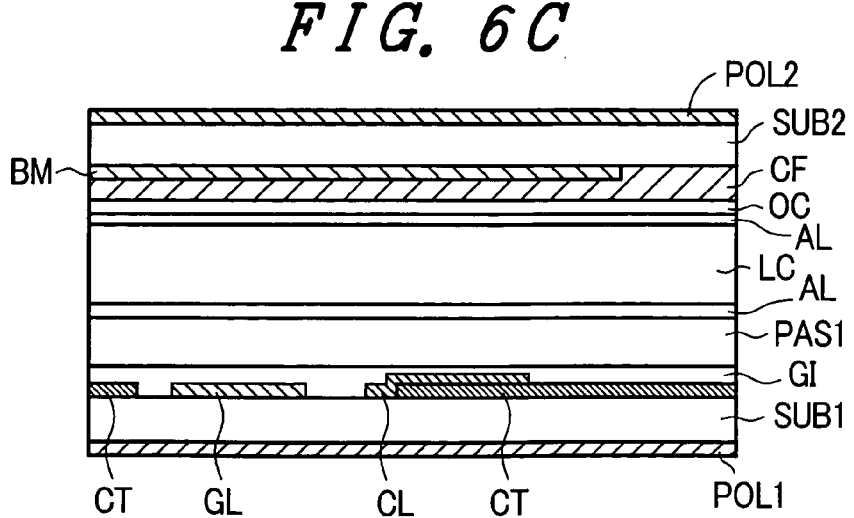

FIG. 5 is a plan view showing another embodiment of the liquid crystal display device according to the invention and corresponds to FIG. 1A. Further, FIG. 6A is a cross-sectional view taken along a line a—a in FIG. 5, FIG. 6B is a cross-sectional view taken along a line b—b in FIG. 5 and FIG. 6C is a cross-sectional view taken along a line c—c in FIG. 5.

The constitution which makes this embodiment different from the embodiment shown in FIG. 1A lies in that, first of all, the counter electrodes CT are not formed over the same layer as the pixel electrodes PX but are formed over the layer below the gate signal lines GL (capacitive signal lines CL) and the first insulation film GI.

Further, the counter electrodes CT are formed of a light transmitting material such as ITO or the like and are formed such that the counter electrode CT covers the substantially whole pixel region and is overlapped to a portion of the capacitive signal line CL.

The pixel electrode PX may be also formed of a light transmitting material such as ITO or the like. In this case, the transparency is further enhanced.

That is, over an upper surface of the counter electrode CT which is formed in a planer shape, the pixel electrodes PX which are formed of a group consisting of a plurality of electrodes are formed by way of an insulation film (first insulation film GI, first protective film PAS1), wherein the optical transmissivity of the liquid crystal is controlled by electric fields which are generated between these respective electrodes.

Further, in this embodiment 3, the protective film which is provided for preventing the direct contact of the thin film transistor TFT with the liquid crystal is formed of only the first protective film PAS1 and the second protective film PAS2 is not formed. This constitution is provided for preventing lowering the strength of the electric field which is generated between the counter electrode CT and the pixel electrodes PX.

Also with respect to the liquid crystal display device having such a constitution, one pixel region is divided into three regions, for example, a video signal from one thin film transistor TFT provided to the pixel is branched into three signals and these signals are supplied to the pixel electrodes PX of the respective regions and, at the same time, the capacitive elements are provided to the respective regions for storing the video signals. Accordingly, this embodiment 3 has the substantially same advantageous effect as the embodiment 1.

In this embodiment, the capacitive elements are also formed between the pixel electrodes PX and the counter electrodes CT.

Here, in this embodiment, the black matrix BM adopts a pattern which is formed in a matrix array to define each pixel from the other neighboring pixels. However, it is needless to say that this embodiment is not limited to this constitution.

Embodiment 4

Figure 7:
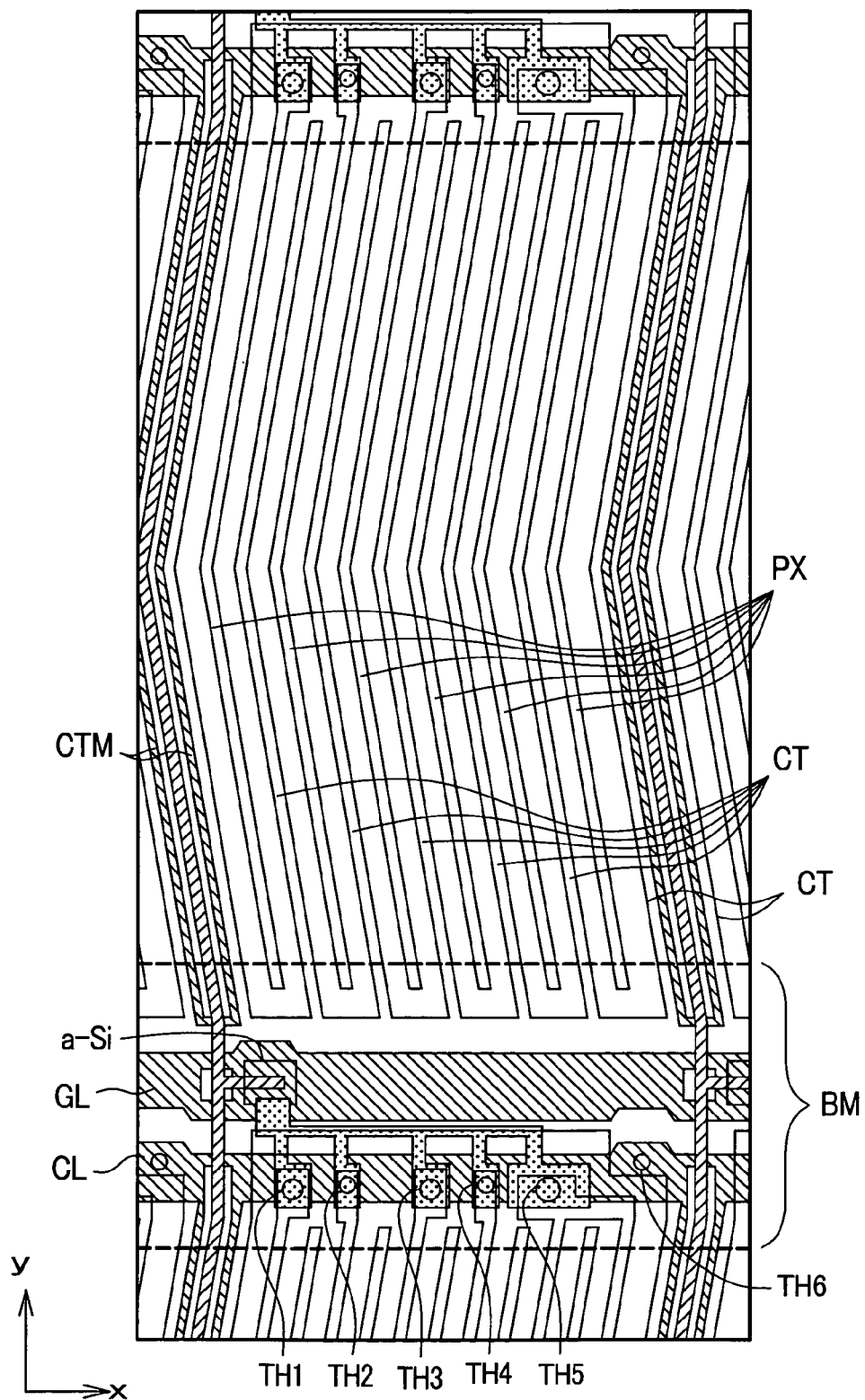
FIG. 7 is a plan view showing another embodiment of the pixel of the display device according to the invention.

FIG. 7 is a plan view showing another embodiment of the liquid crystal display device according to the invention and corresponds to FIG. 1A.

The constitution which makes this embodiment different from the embodiment shown in FIG. 1A lies in the consti- tution of the capacitive elements Cstg which are formed between the source electrode ST of the thin film transistor TFT and the pixel electrodes PX which are connected to the source electrode ST.

Although in the case of FIG. 1A, each capacitive element Cstg is constituted in common with a plurality of pixel electrodes PX, the pixel of the embodiment 4 shown in FIG. 7 includes the pixel electrodes PX such that one pixel electrode PX is provided with one capacitive element Cstg.

Accordingly, the number of branching from the source electrode ST of the thin film transistor TFT to the pixel electrodes PX through respective capacitive elements Cstg can be increased and hence, lowering of brightness of the pixel after repairing can be minimized.

In this case, at positions where the capacitive elements Cstg are formed, the number of the through holes TH which are served for electrically connecting the electrodes of the capacitive elements Cstg and the pixel electrode PX is increased corresponding to the above-mentioned increase of the number of branching. Therefore, in this embodiment, the respective through holes TH which are mounted in parallel in the x direction in the drawing are arranged such that the respective through holes TH are shifted in the y direction every one other and hence, a spaced-apart distance between each through hole TH and the other through hole TH arranged close to the through hole TH can be increased as much as possible.

In this embodiment, as shown in FIG. 7, although there exists the capacitive element Cstg which is allocated to a plurality of pixel electrodes PX in common among the respective capacitive elements Cstg, such a constitution is determined based on the spaced-apart distance between one through hole Th and other neighboring through hole TH and hence, it is not always necessary to determine the branching from the source electrode ST of the thin film transistor TFT for every pixel electrode PX.

Embodiment 5

FIG. 8A is a plan view showing another embodiment of the liquid crystal display device according to the invention and corresponds to FIG. 1A.

The constitution which makes this embodiment different from the embodiment shown in FIG. 1A lies in that, first of all, with respect to the pixel to which the thin film transistor TFT supplies the video signal therethrough, the thin film transistor TFT is configured to be prepared to supply the same video signal to the pixel electrode PX of another pixel arranged close to the pixel along the drain signal line DL (the upper-side pixel in the drawing).

That is, first of all, with respect to the thin film transistor TFT, interposing the drain electrode DT which is connected to the drain signal line DL, besides a source electrode ST which is formed at the lower side in the drawing, a second source electrode ST2 is also formed at the upper side in the drawing. The second source electrode ST2 extends to cover the pixel region at the side where the second source electrode ST2 is formed and is, then, branched and extended until branched portions are overlapped to distal end portions of the respective pixel electrodes PX in a plurality of (three in the drawing) divided regions in the pixel region.

Here, due to such a constitution, the thin film transistors TFT share the drain electrode DT in common, wherein the thin film transistor TFT which is operated between the source electrode ST and the pixel electrodes PX may be referred to as a driving transistor and the thin film transistor TFT which is operated between the second source electrode ST2 and the pixel electrodes PX may be referred to as a correction transistor.

In a usual (before repairing) state, the distal end portions of the respective pixel electrodes PX and the second source electrode ST2 of the thin film transistor TFT are not electrically connected to each other. This is because that, as shown in FIG. 8B which is a cross-sectional view, while the second source electrode ST2 of the thin film transistor TFT is arranged below the first protective film PAS1, the respective pixel electrodes PX are arranged above the second protective film PAS2. Here, FIG. 8B is a cross-sectional view taken along a line b—b in FIG. 8A.

Figure 9A:
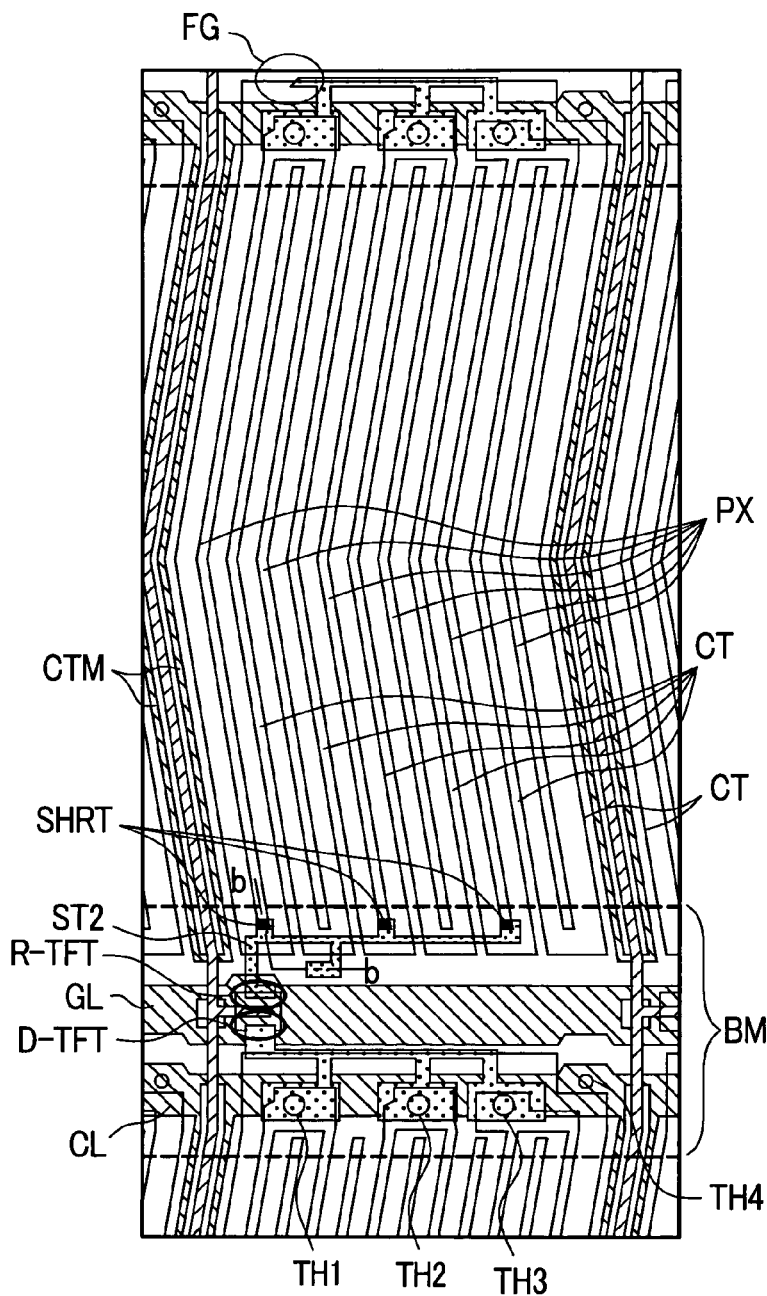
FIG. 9A to 9D are constitutional view showing another embodiment of the pixel of the display device according to the invention.

In such a constitution, during the manufacturing steps of the liquid crystal display device, as shown in FIG. 9A, when a defect such as a disconnection (indicated by FG in the drawing), for example, occurs at a portion of the wiring from the thin film transistor TFT, the signal from the thin film transistor TFT is not supplied to the pixel electrode PX and the pixel which is to be driven by the thin film transistor TFT becomes a black points over the whole region.

This embodiment enables the supply of the signal to the pixel electrodes PX from the thin film transistor TFT for defect correction which is driven by another gate signal line GL arranged close to the defective pixel and hence, the display can be restored.

That is, when the defect FC occurs and there arises a state that the signal is not supplied from the driving thin film transistor TFT to the pixel electrodes PX due to the defect FC, the output from the correction thin film transistor TFT and the pixel electrodes PX are made electrically conductive with each other using laser beams or the like (shown by SHRT in the drawing). Accordingly, the liquid crystal display device returns from the above-mentioned state to a state in which the video signal is supplied to the pixel electrodes PX from the correction thin film transistor TFT and hence, the point defect on the display is repaired.

Here, although the image displayed on the repaired pixel is shifted by one pixel, by performing the same display between the neighboring pixels having the same color, it is difficult for a viewer to recognize the presence of the defect in the pixel in a usual using state and hence, it is almost possible to restore the normal operation in an actual operation.

Here, to facilitate forming of the conductive state by laser beams, it is preferable to provide the constitution in which the output from the correction thin film transistor TFT is wired using a metal layer and is overlapped to the pixel electrode PX by way of an insulation film. It is because that with the use of the metal layer having the good heat absorption ratio, the connection can be performed easily by irradiation of laser beams from a back surface of the transparent substrate SUB1.

Figure 9B:
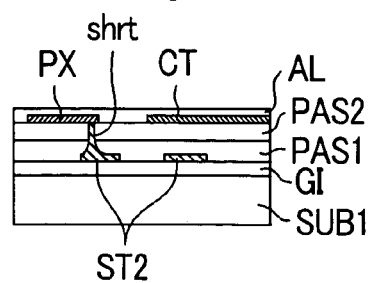

FIG. 9B is a cross-sectional view taken along a line b—b in FIG. 9A, wherein FIG. 9B shows that the second source electrode ST2 of the thin film transistor TFT and the pixel electrode PX are electrically connected with each other by the irradiation of laser beams.

Figure 9C:
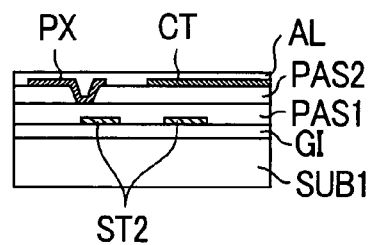
Figure 9D:
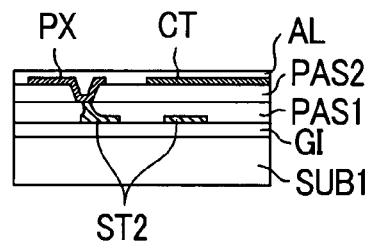

Further, FIG. 9C is a view showing another improved embodiment and corresponds to FIG. 9B. At portions where the second source electrode ST2 of the thin film transistor TFT and the pixel electrode PX are connected for repairing, holes are formed in the second insulation film PAS2. Due to such a constitution, the connection of the respective members by the laser beams can be easily performed. FIG. 9D shows a cross section in which the connection is established in the constitution shown in FIG. 9C.

Embodiment 6

Figure 10:
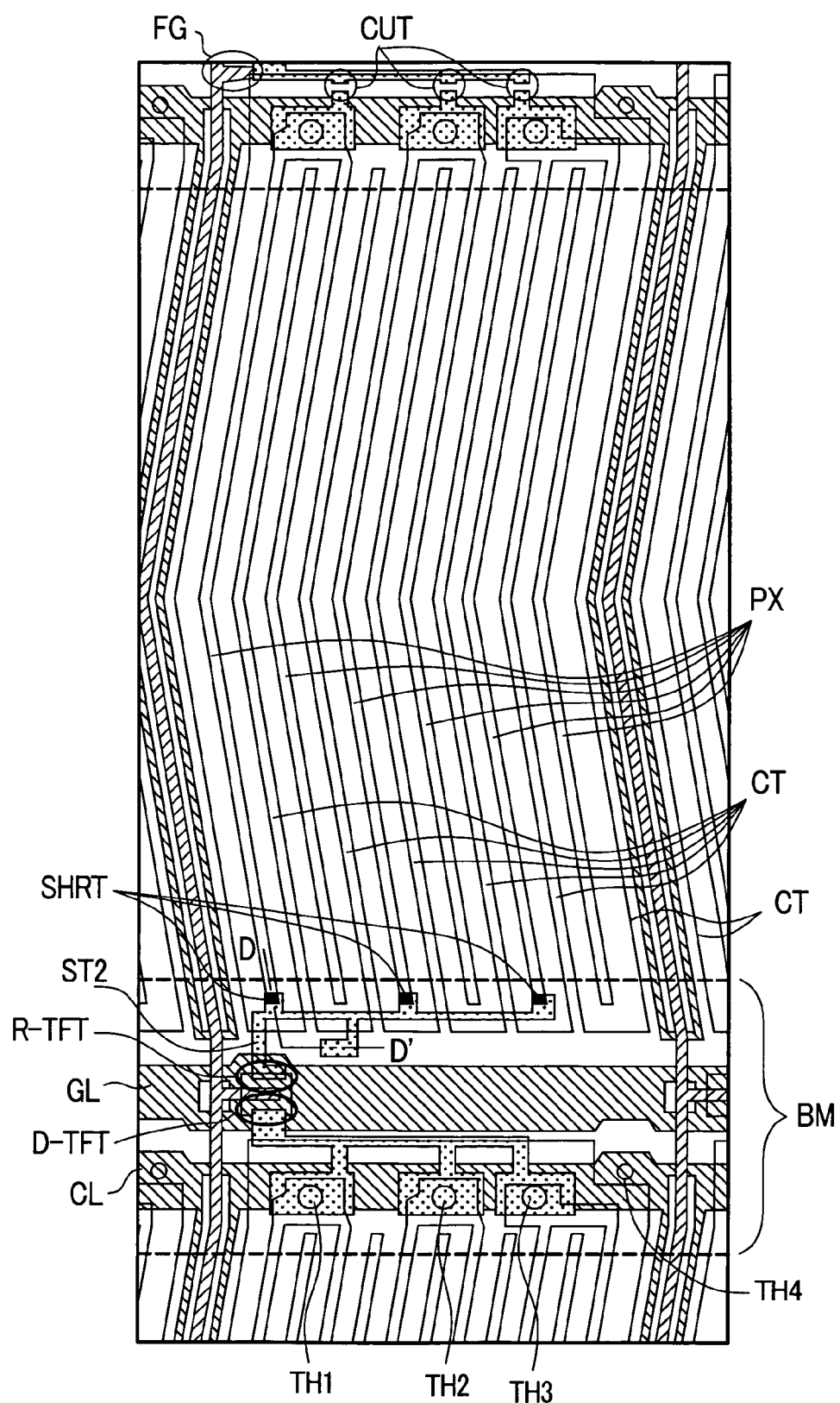
FIG. 10 is a plan view showing another embodiment of the pixel of the display device according to the invention.

FIG. 10 shows a mode of repairing the liquid crystal display device shown in FIG. 9 in which the drain signal line DL and a portion of the source electrode ST of the thin film transistor TFT before branching are short-circuited (showing FG in the drawing).

In this case, the branching portions for connection from the source electrode ST of the thin film transistor TFT to the pixel electrodes PX in respective divided regions of the pixel region are cut by laser beams (indicated by CUT in the drawing), for example, and, at the same time, the connection of the second source electrode ST2 of the thin film transistor TFT which drives the pixel positioned at the lower side of the pixel in the drawing and the pixel electrode PX is established (indicated by SHRT in the drawing).

Also in such repairing, although the image displayed on the repaired pixel is shifted by one pixel, by performing the same display between the neighboring pixels having the same color, it is difficult for a viewer to recognize the presence of the defect in the pixel in a usual using state and hence, it is almost possible to restore the normal operation in an actual operation.

Embodiment 7

Figure 11A:
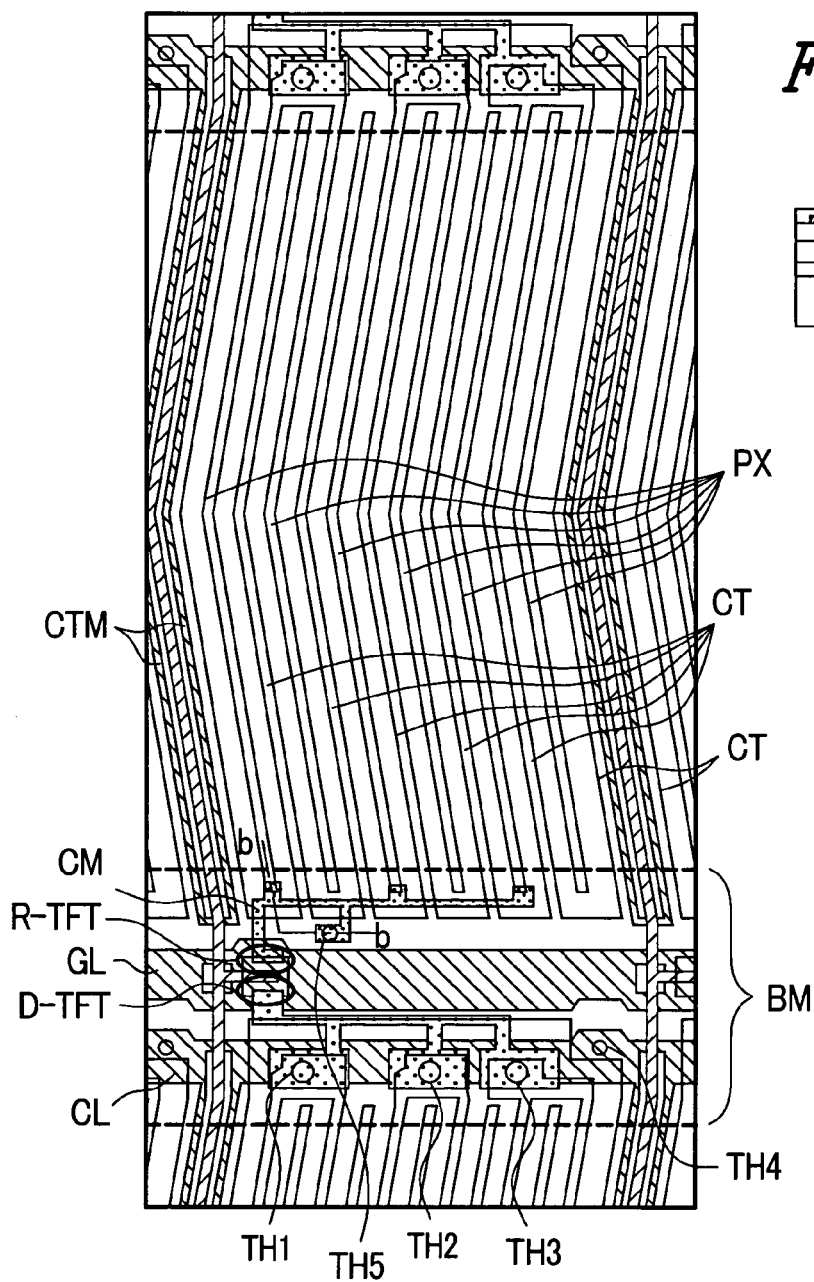
FIGS. 11A and 11B are constitutional view showing another embodiment of the pixel of the display device according to the invention.

FIG. 11A is a view showing another embodiment of the liquid crystal display device according to the invention and corresponds to FIG. 9A.

The constitution which makes this embodiment different from the embodiment shown in FIG. 9A is as follows. First of all, a portion of the second source electrode ST2 of the thin film transistor TFT covers the gate signal line GL and the capacitive signal line CL, and extends in an exposed manner from a material layer which is held with the same potential as the counter electrode CT (counter voltage signal line COL) and, thereafter, is branched. A portion of the branched paths extends to the material layer side and is again overlapped to the material layer side, and the second source electrode ST2 and the material layer are made conductive to each other via a through hole TH5 formed in a portion of the overlapped portion.

Figure 11B:
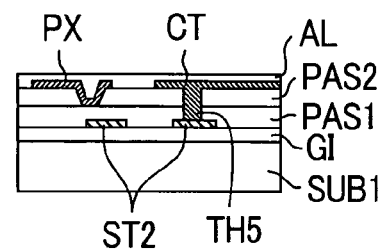

In this case, as shown in FIG. 11B which is across-sectional view taken along a line b—b in FIG. 11A, the second source electrode ST2 of the thin film transistor TFT and the pixel electrodes PX of the pixel are overlapped to each other by way of the second protective film PAS2 and the first protective film PAS1 and the capacitances are generated at such portions.

Accordingly, the potential of the second source electrode ST2 is influenced by the potential of the pixel electrode PX of the pixel at the lower-side in the drawing which is arranged closer to the capacitance.

On the other hand, the second source electrode ST2 of the thin film transistor TFT is formed over the gate signal line GL in an overlapped manner and hence, when the potential of the second source electrode ST2 is largely changed, there exists a possibility that the writing characteristics of the gate signal line GL is influenced. Particularly, when there exists a large difference in voltage between display images, for example, when the white display and the black display are performed by the neighboring pixels, there arises the influence on the writing characteristics of the gate signal lines GL.

As a result, the brightness of one line arranged in a boundary portion between white and black exhibits a value between white and black and hence, the boundary appears slightly blurred. This phenomenon can be eliminated by designing the capacitance of the overlapped portion or the like. However, it is desirable to obviate such a phenomenon in terms of the operational principle for increasing the degree of freedom in designing and for facilitating the correction of defect by increasing an area of the overlapped portion of the second source electrode ST2 of the thin film transistor TFT and the pixel electrode PX.

According to the constitution of this embodiment, in the normal state, the potential of the second source electrode ST2 of the thin film transistor TFT assumes a so-called common potential and is stabilized and hence, the influence on the writing to the gate attributed to the correction thin film transistor TFT becomes uniform over the whole screen and hence, the local change of brightness is no more generated in principle. Accordingly, with respect to the display image, the influence attributed to the correction thin film transistor TFT can be eliminated in terms of the operational principle.

Embodiment 8

Figure 12A:
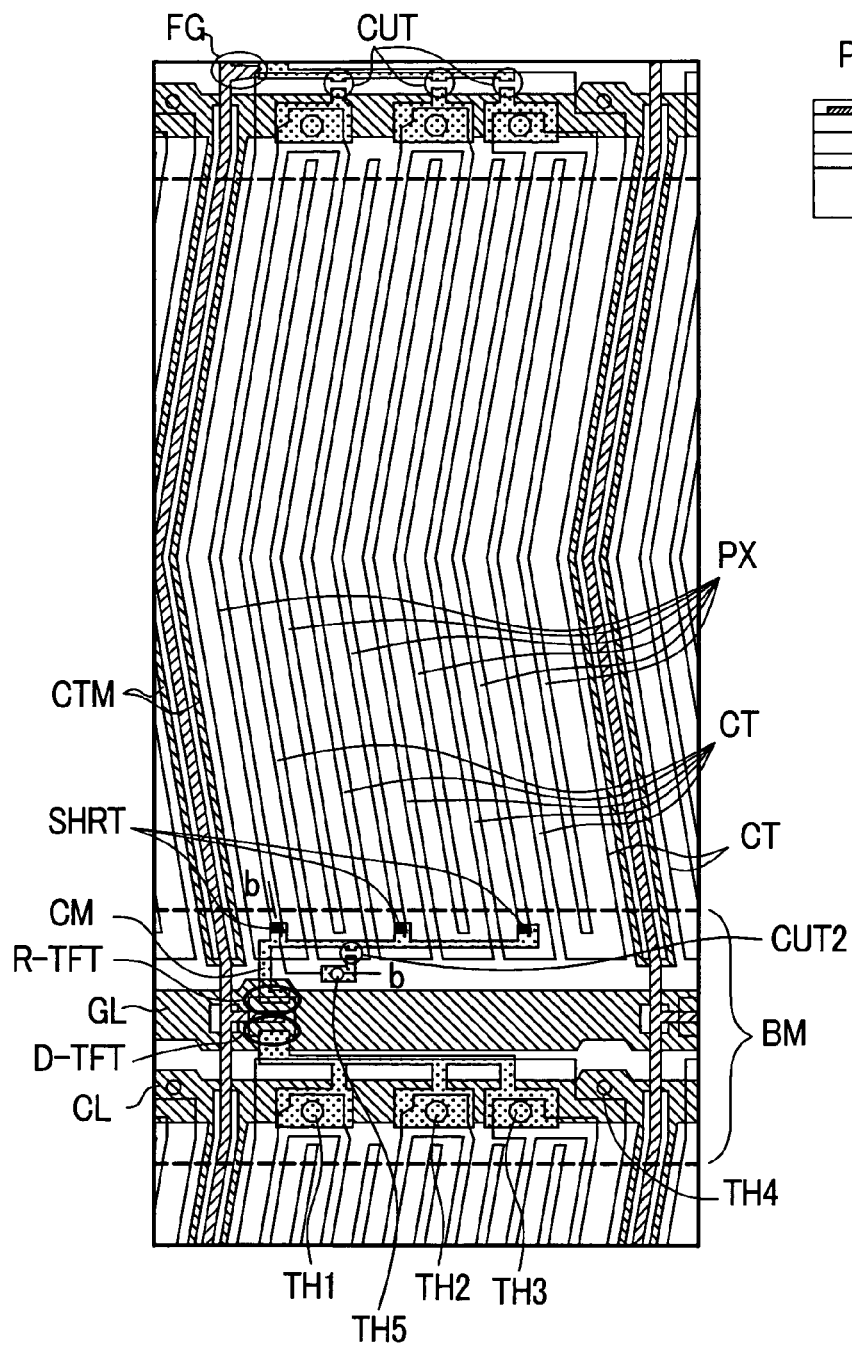
FIGS. 12A and 12B are view showing a mode of repairing a pixel defect of the display device shown in FIG. 11.

FIG. 12A shows a mode of repairing the liquid crystal display device shown in FIG. 11 in which the drain signal line DL and a portion of the source electrode ST of the thin film transistor TFT before branching are short-circuited (showing FG in the drawing).

In this case, the branching portions for connection from the source electrode ST of the thin film transistor TFT to the pixel electrodes PX in respective divided regions of the pixel region are cut by laser beams (indicated by CUT in the drawing), for example, and, at the same time, the connection of the second source electrode ST2 of the thin film transistor TFT which drives the pixel positioned at the lower side of the pixel in the drawing and the pixel electrode PX is established (indicated by SHRT in the drawing).

Further, a path which connects the second source electrode ST2 of the thin film transistor TFT and a material layer which covers the gate signal line GL and the capacitive signal line CL and is held at the same potential as the counter electrodes CT is cut by the irradiation of laser beams, for example (indicated by CUT2 in the drawing).

Accordingly, it is possible to supply the video signal from the second source electrode ST2 of the thin film transistor TFT to the pixel and hence, the defect can be repaired.

Figure 12B:
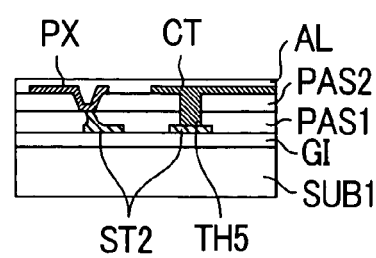

FIG. 12B is a cross-sectional view taken along a line b—b in FIG. 12A after repairing the defect.

Also in such repairing, although the image displayed on the repaired pixel is shifted by one pixel, by performing the same display between the neighboring pixels having the same color, it is difficult for a viewer to recognize the presence of the defect in the pixel in a usual using state and hence, it is almost possible to restore the normal operation in an actual operation.

Embodiment 9

Figure 13:
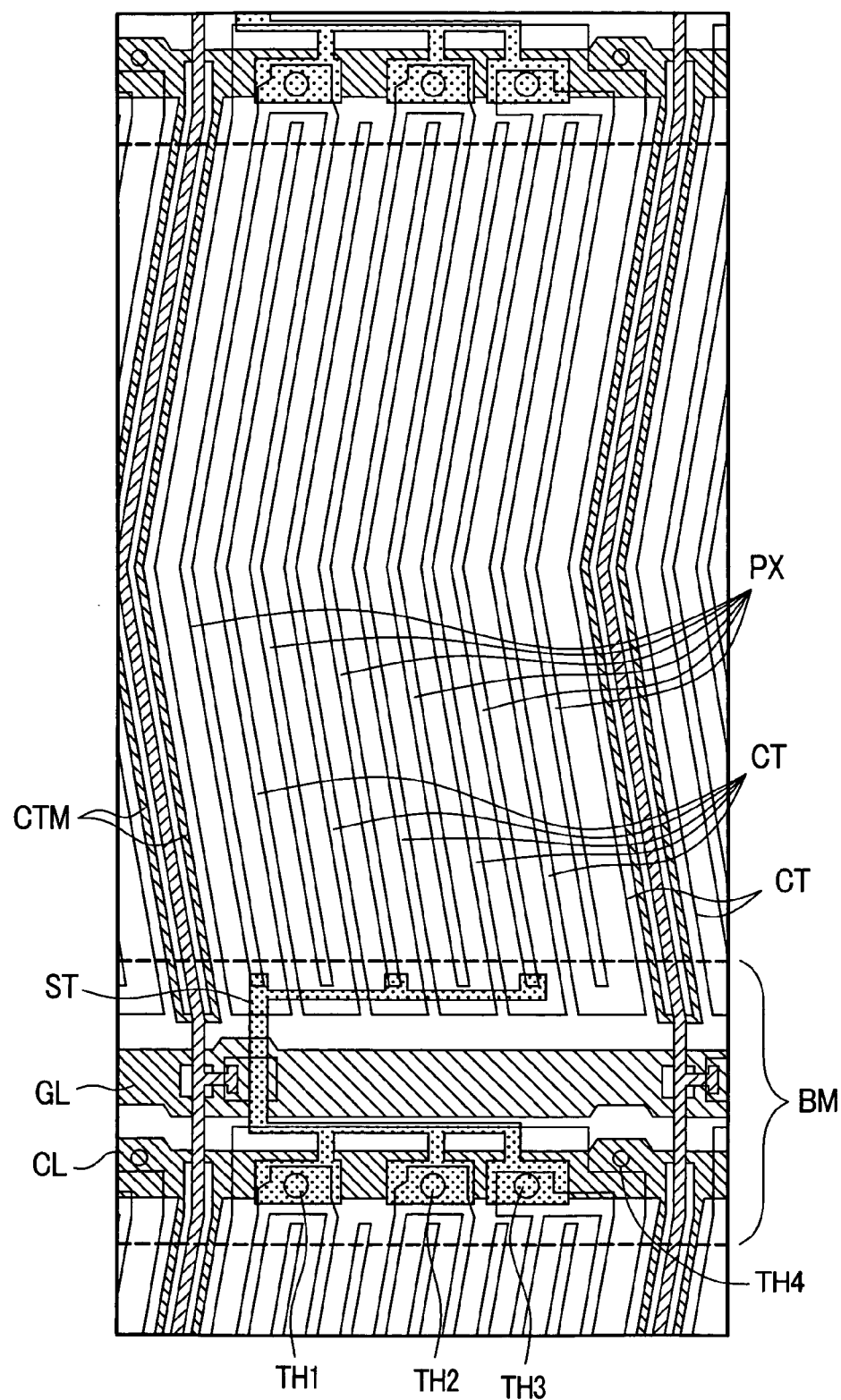
FIG. 13 is a plan view showing another embodiment of the pixel of the display device according to the invention.

FIG. 13 is a view showing another embodiment of the liquid crystal display device according to the invention and corresponds to FIG. 11A.

The constitution which makes this embodiment different from the embodiment shown in FIG. 11A lies in the structure of the source electrode ST of the thin film transistor TFT.

A channel length of the channel region of the thin film transistor TFT is arranged to be aligned with the extending direction of the gate signal line GL. Due to such a constitution, the source electrode ST of the thin film transistor TFT extends in the direction orthogonal to the extending direction of the gate signal line GL, wherein one end of the source electrode ST extends to the pixel region which is positioned at the lower side in the drawing and another end of the source electrode ST extends to the pixel region which is positioned at the upper side in the drawing.

The source electrode ST which extends to the pixel region positioned at the lower side in the drawing is configured such that the video signal for driving the pixel is supplied to the source electrode ST, while the source electrode ST which extends to the pixel region positioned at the upper side in the drawing is configured such that the source electrode ST is capable of being connected with the respective pixel electrodes PX of the pixel at the time of repairing.

Due to such a constitution, as shown in FIG. 11, the source electrode ST which extends to the pixel region positioned at the upper side in the drawing also covers the gate signal line GL and the capacitive signal line CL and, at the same time, the electric connection of the source electrode ST with the material layer (counter voltage signal line COL) held with the same potential as the counter electrode CT becomes no more necessary.

This is because that the source electrode ST which extends to the pixel region positioned at the upper side in the drawing assumes the same potential as the source electrode ST which extends to the pixel region positioned at the lower side in the drawing and hence, the potential is stabilized due to the capacitive element Cstg which is formed in the pixel region positioned at the lower side in the drawing.

Embodiment 10

FIG. 14A is a view showing another embodiment of the liquid crystal display device according to the invention and corresponds to FIG. 12A. FIG. 14B is a cross-sectional view taken along a line b—b in FIG. 14A.

The constitution which makes this embodiment different from the embodiment shown in FIG. 12A lies in that, first of all, this embodiment 10 is not provided with the second source electrode ST2 of the thin film transistor TFT which extends to the pixel region positioned at the upper side in the drawing with respect to the thin film transistor TFT.

Further, this embodiment 10 includes a conductive layer PXM which is formed such that the conductive layer PXM crosses both of the gate signal line GL and the capacitive signal line CL which is arranged close to the gate signal line GL, wherein the conductive layer PXM is formed over the same layer as the drain signal line DL, for example.

One end of the conductive layer PXM extends to be overlapped to one end of the pixel electrode PX in the pixel region positioned at the upper side in the drawing and an extension portion is connected with the pixel electrode PX via a through hole TH5 which penetrates the second protective film PAS2 and the first protective film PAS1. Further, another end of the conductive layer PXM is overlapped to the capacitive signal line CL by way of the first insulation film GI.

Due to such a constitution, the pixel electrode PX in the pixel region which is positioned at the upper side of the drawing forms the capacitance Cadd between the pixel electrode PX and the gate signal line GL of the neighboring pixel region which differs from the former pixel region and, at the same time, forms the capacitance Cstg between the pixel electrode PX and the capacitive signal line CL.

As anther embodiment, the pixel electrode PX in the pixel region which is positioned at the upper side of the drawing may be made to directly extend and to cross the gate signal line GL and the capacitive signal line CL of the neighboring pixel region different from the former pixel region. In this case, the substantially same advantages can be obtained. However, in this embodiment, a material layer (counter voltage signal line COL) which covers the gate signal line GL and the capacitive signal line CL and has the same potential as the counter electrode CT is present on the same layer as the pixel electrodes PX. Accordingly, using the conductive layer PXM which is formed over the layer different from the layer over which the pixel electrodes PX are formed, the above-mentioned capacitances Cadd and Cstg can be formed.

Embodiment 11

Figure 15A:
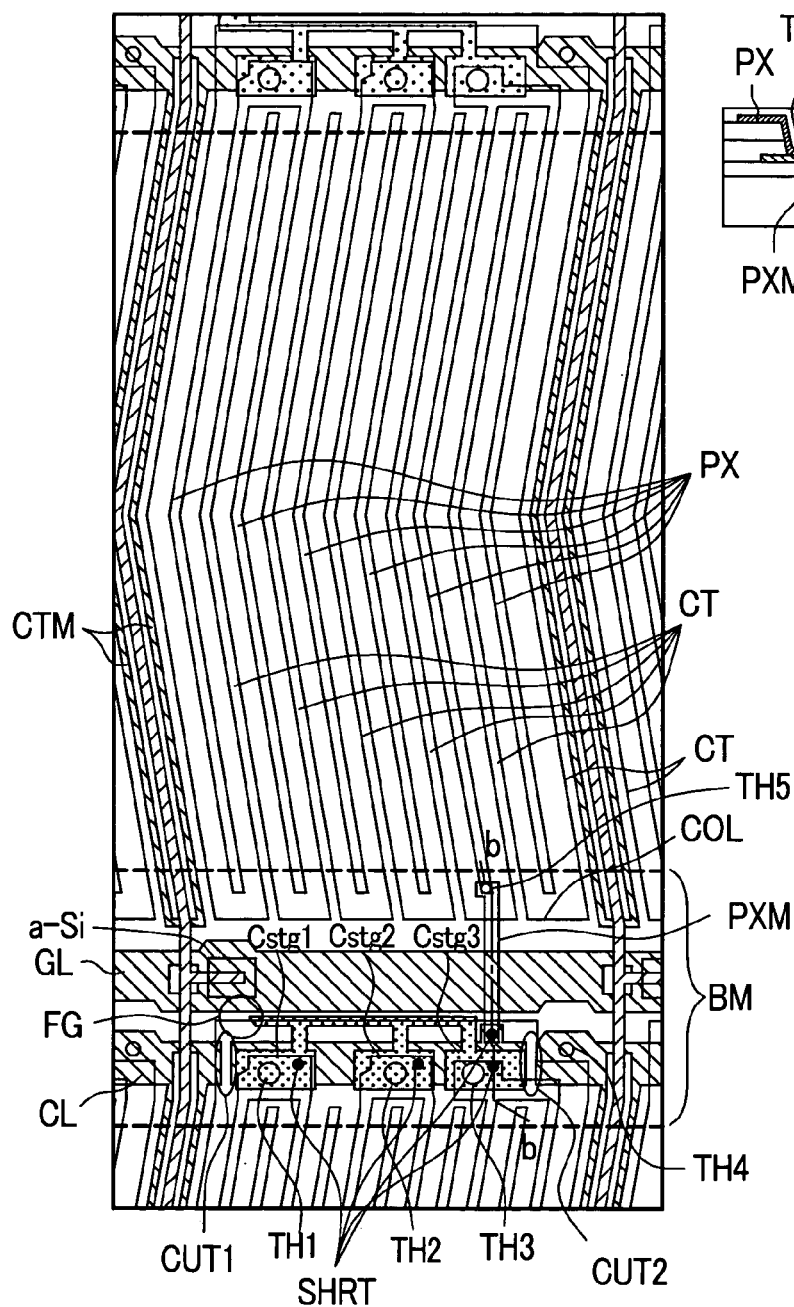
FIGS. 15A and 15B are constitutional view showing another embodiment of a pixel of a display device according to the invention.

FIG. 15A shows a mode of repairing when a disconnection (indicated by FG in the drawing) occurs, that is, a point defect occurs at a connection path of the source electrode ST of the thin film transistor TFT with the respective pixel electrodes PX disposed in the pixel region at the lower side in the drawing, for example, in the liquid crystal display device having the constitution shown in FIG. 14.

First of all, to electrically isolate the capacitive signal line CL in the pixel region at the lower side in the drawing, respective side portions of the capacitive signal line CL are cut such that the respective capacitive elements Cstg1, Cstg2, Cstg3 are arranged between both side portions using laser beams, for example (indicated by CUT1, CUT2 in the drawing). Due to such a constitution, a conductive layer in a floating state is obtained.

Then, the floated conductive layer and the above-mentioned conductive layer PXM are electrically connected with each other (indicated by SHRT in the drawing) using laser beams, for example. Further, the conductive layer PXM and the capacitive signal line CL disposed below the conductive layer PXM are electrically connected with each other using laser beams, for example.

Accordingly, the respective pixel electrodes PX in the pixel region at the lower side in the drawing assume the same potential as the respective pixel electrodes PX in the pixel region at the upper side in the drawing. In other words, the video signals of the pixel region at the upper side of the drawing are supplied to the respective pixel electrodes PX in the pixel region at the lower side in the drawing. Accordingly, it is possible to restore the defect of the pixel.

Figure 15B:
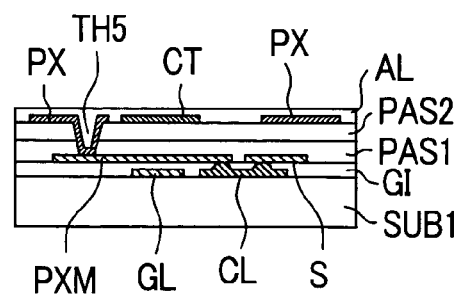

As shown in FIG. 15B which is a cross-sectional view taken along a line b—b in FIG. 15A, although the connection between the source electrode ST and the pixel electrodes PX is not shown, as can be clearly understood from the plan view, the source electrode ST and the pixel electrode PX are connected via the through hole TH3 and hence, by connecting the source electrode ST and the capacitive signal line CL, it is possible to connect the pixel electrodes PX of two neighboring pixels.

Here, since the counter electrode CT is connected with the capacitive signal line CL via the through hole TH4, even when the capacitive signal line CL is cut in the above-mentioned manner, the electrical connection between the capacitive signal line CL and the counter electrode CT is normally maintained via other pixel.

Here, as shown in FIG. 15A, the material layer (counter voltage signal line COL) which is formed in a state that the material layer sufficiently covers the gate signal line GL and holds the same potential as the counter electrode CT is formed to expose portions of the capacitive signal line CL where the capacitive elements Cstg1, Cstg2, Cstg3 are formed. Due to such a constitution, the capacitive signal line CL can be easily cut using the laser beams.

Further, by performing this cutting linearly, it is possible to shorten a repairing time and to surely perform the repairing operation. Accordingly, this embodiment ensures a linear region where the gate signal line GL is exposed from other electrode by cutting a portion of the gate signal line GL.

Embodiment 12

Figure 16:
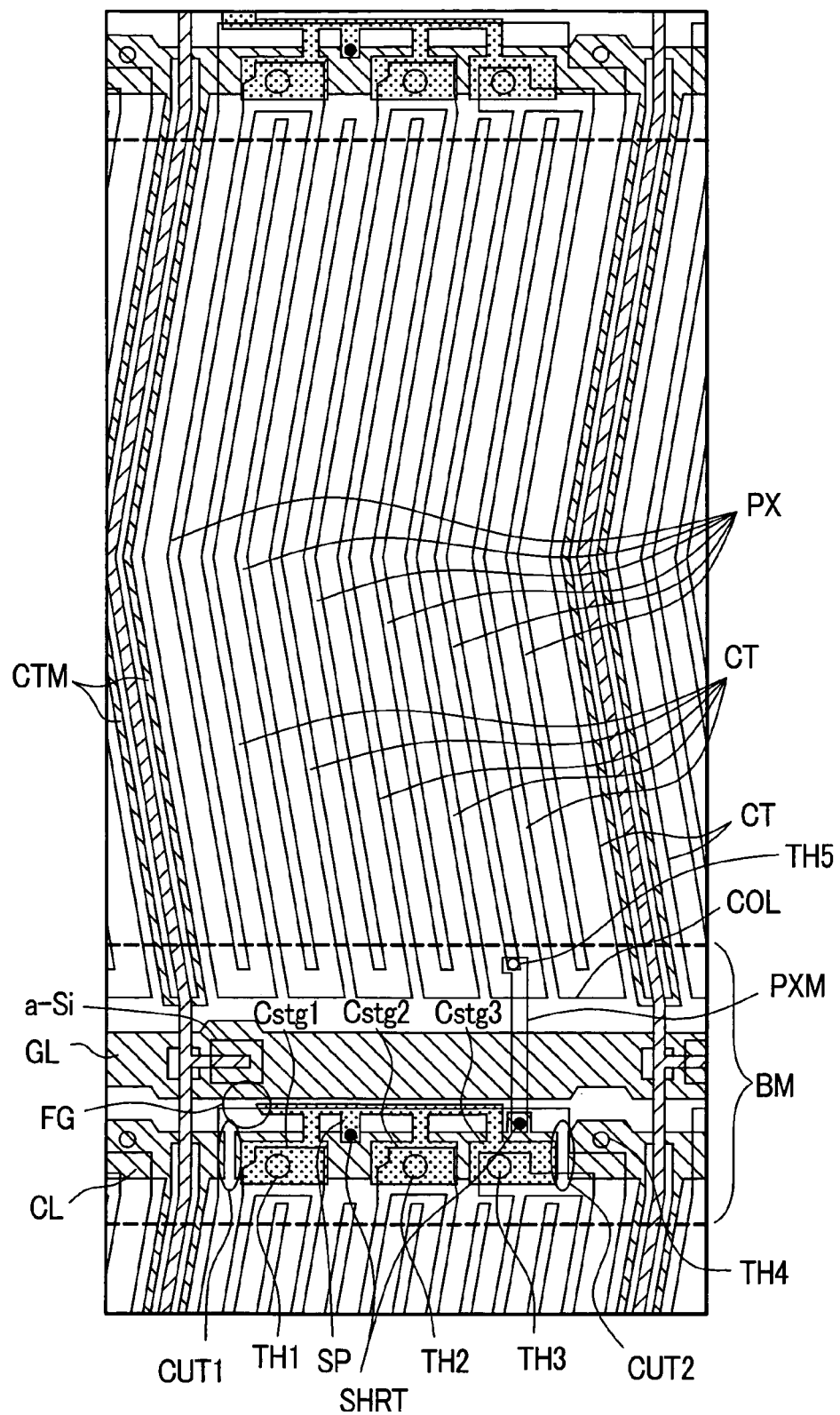
FIG. 16 is a plan view showing another embodiment of the pixel of the display device according to the invention.

FIG. 16 is a view showing another embodiment of the liquid crystal display device according to the invention and corresponds to FIG. 14A. The constitution which makes this embodiment different from the embodiment shown in FIG. 14A lies in that, in addition to the branched paths through which the video signals are supplied from the source electrode ST of the thin film transistor TFT to the respective pixel electrodes PX in three divided pixel regions, for example, another branched path is formed and this branched path SP is overlapped to the capacitive signal line CL by way of the first insulation film GI.

In this case, when a point defect which is substantially equal to the point defect explained in conjunction with embodiment 11 occurs, the short-circuiting operation between the capacitive signal line CL and the respective pixel electrodes PX of three divided pixel regions, for example, can be replaced with the short-circuiting operation between the capacitive signal line CL and the branched path SP as shown in the embodiment 11 and hence, the efficiency of the repairing operation can be enhanced.

Embodiment 13

Figure 17:
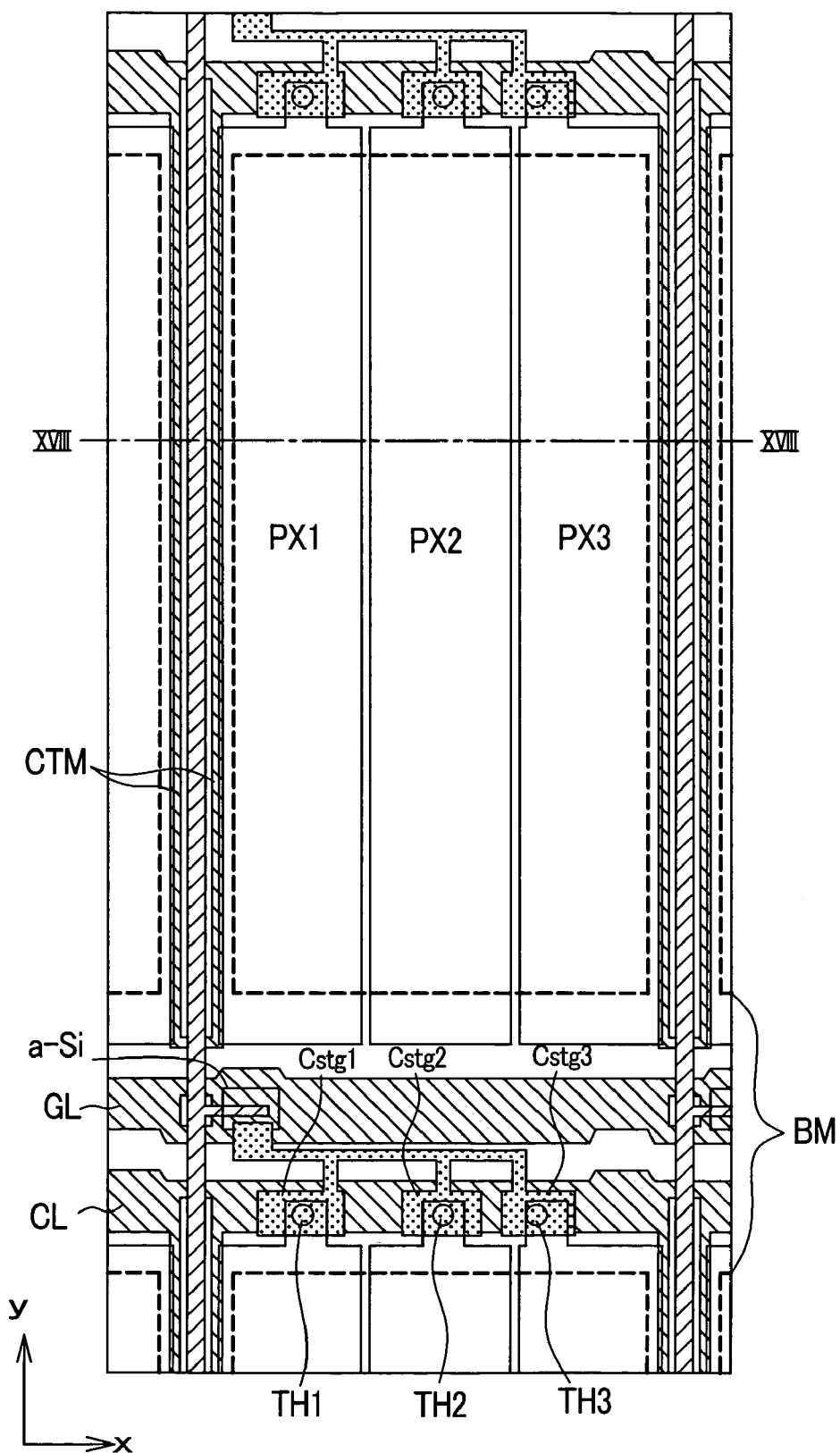
FIG. 17 is a plan view showing another embodiment of the pixel of the display device according to the invention.

FIG. 17 is a plan view showing another embodiment of the pixel of the liquid crystal display device according to the invention.

The pixel shown in FIG. 17 is different from the pixels explained in conjunction with the above-mentioned respective embodiments and is referred to as a so-called vertical electric field type pixel. That is, out of respective transparent substrates which are arranged to face each other in an opposed manner with liquid crystal therebetween, over each one of respective pixel regions formed over a liquid-crystal-side surface of one transparent substrate SUB1, pixel electrodes PX formed of a light transmitting conductive layer are formed such that the pixel electrode PX substantially covers the whole area of the pixel region. On the other hand, a counter electrode CT which is arranged in common with the respective pixel electrodes PX and is also made of a light transmitting conductive layer is formed over a liquid-crystal-side surface of another transparent substrate SUB2.

In each pixel region, between the pixel electrode PX to which the video signals are supplied independently and the counter electrode CT to which a reference signal which becomes the reference with respect to the video signals is supplied, an electric field which is directed in the direction substantially perpendicular to the transparent substrate is generated whereby the optical transmissivity of the liquid crystal between the electrodes is controlled.

Here, each pixel region is, in the same manner as the pixels of the above-mentioned respective embodiments, formed of a region, for example, surrounded by gate signal lines GL which extend in the x direction and are arranged in parallel in the y direction and drain signal lines DL which extend in the y direction and are arranged in parallel in the x direction. To the pixel electrodes PX in the pixel region, the video signals are supplied from the one-side drain signal line DL through the thin film transistor TFT which is turned on in response to the scanning signal from the one-side gate signal line GL.

Further, the pixel region is divided into three regions, for example, in the x direction in the drawing and the pixel electrodes PX1, PX2, PX3 which are electrically independent from each other are respectively formed in the respective regions.

The video signals are configured to be supplied to these respective pixel electrodes PX1, PX2, PX3 from the source electrode ST of the thin film transistor TFT for driving the pixel through three branched paths.

Further, between the respective pixel electrodes PX1, PX2, PX3 and the thin film transistor TFT, a capacitive signal line CL which is arranged close to and parallel to the gate signal line GL which drives the thin film transistor TFT is formed, and capacitive elements Cstg1, Cstg2, Cstg3 are formed over the capacitive signal line CL for respective defined regions of the pixel region.

That is, one video signal which is branched from the source electrode ST of the thin film transistor TFT through the path is supplied to the pixel electrode PX1 and, at the same time, the video signal is stored in the capacitive element Cstg1, another one video signal is supplied to the pixel electrode PX2 and, at the same time, the video signal is stored in the capacitive element Cstg2, and other remaining video signal is supplied to the pixel electrode PX3 and, at the same time, the video signal is stored in the capacitive element Cstg3.

Here, the respective capacitive elements Cstg1, Cstg2, Cstg3 are, in the same manner as the constitution shown in the embodiment 1, respectively formed of the capacitive signal line CL, a first insulation film GI which is formed over the capacitive signal line CL, branched extended portions of the source electrodes ST which are formed over an upper surface of the insulation film GI, a first protective film PAS1 and a second protective film PAS2 which are formed over an upper surface of the extended portions, and the pixel electrodes PX1, PX2, PX3 which are formed over the second protective film PAS2 and are electrically connected with the branched extended portions of the source electrode ST via through holes TH1, TH2, TH3 which penetrate the second protective film PAS2 and the first protective film PAS1.

Figure 18A:
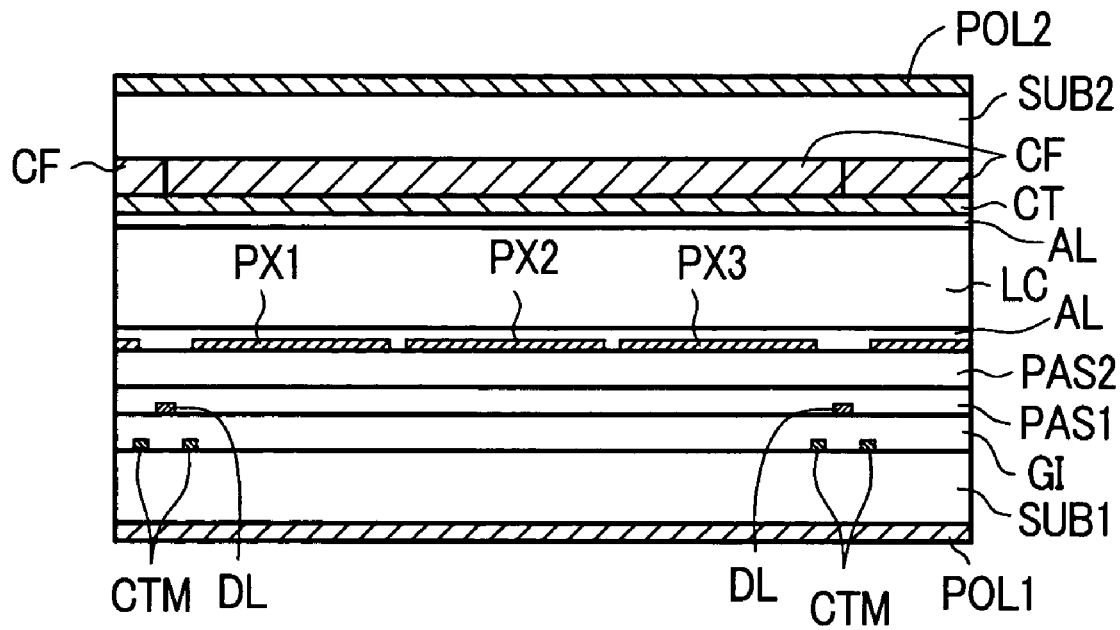
FIGS. 18A and 18B are examples of cross-sectional view taken along a line XVIII—XVIII in FIG. 17.

FIG. 18A is a cross-sectional view taken along a line XVIII—XVIII in FIG. 17. It is made clear from the drawing that the pixel electrode PX is divided into and is constituted of three pixel electrodes PX1, PX2, PX3. Further, over a liquid-crystal-side surface of the transparent substrate SUB2, a counter electrode CT which is formed in common with the respective pixels is formed.

Here, this embodiment uses the liquid crystal LC which performs the behavior in response to an electric field having components perpendicular to the transparent substrates SUB1, SUB2 and hence, there arises a fear that a so-called domain appears in separating portions of the respective pixel electrodes PX1, PX2, PX3.

Figure 18B:
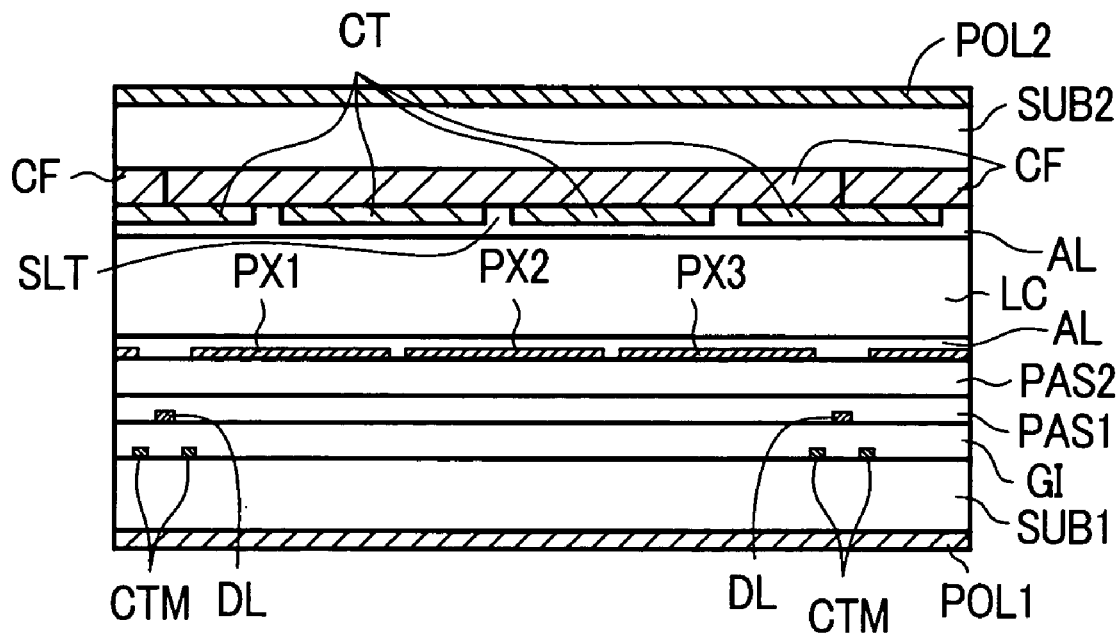

FIG. 18B is a cross-sectional view showing another embodiment which can eliminate such a fear and corresponds to FIG. 18A. That is, slits SLT, for example, are formed in the counter electrode CT and these slits SLT are arranged such that the slits SLT face the substantially centers of the pixel electrodes PX1, PX2, PX3 and extend in they direction. In other words, in one pixel region, the respective counter electrodes CT having a pattern which is substantially equal to the pattern of the respective pixel electrodes PX1, PX2, PX3 are arranged in a state that the respective counter electrodes CT are shifted with respect to the respective pixel electrodes PX. In the drawing, as an example, the respective counter electrodes CT are shifted by a half pitch in the x direction.

Here, this embodiment uses the liquid crystal LC which performs the behavior in response to an electric field having components along the direction which makes a slight angle with respect to the vertical direction of the transparent substrates SUB1, SUB2. This method is referred to as a so-called vertical orientation method.

By adopting such a constitution, the so-called domain is no more generated and hence, a drawback which arises when the pixel electrode PX is separated can be eliminated.

Embodiment 14

Figure 19:
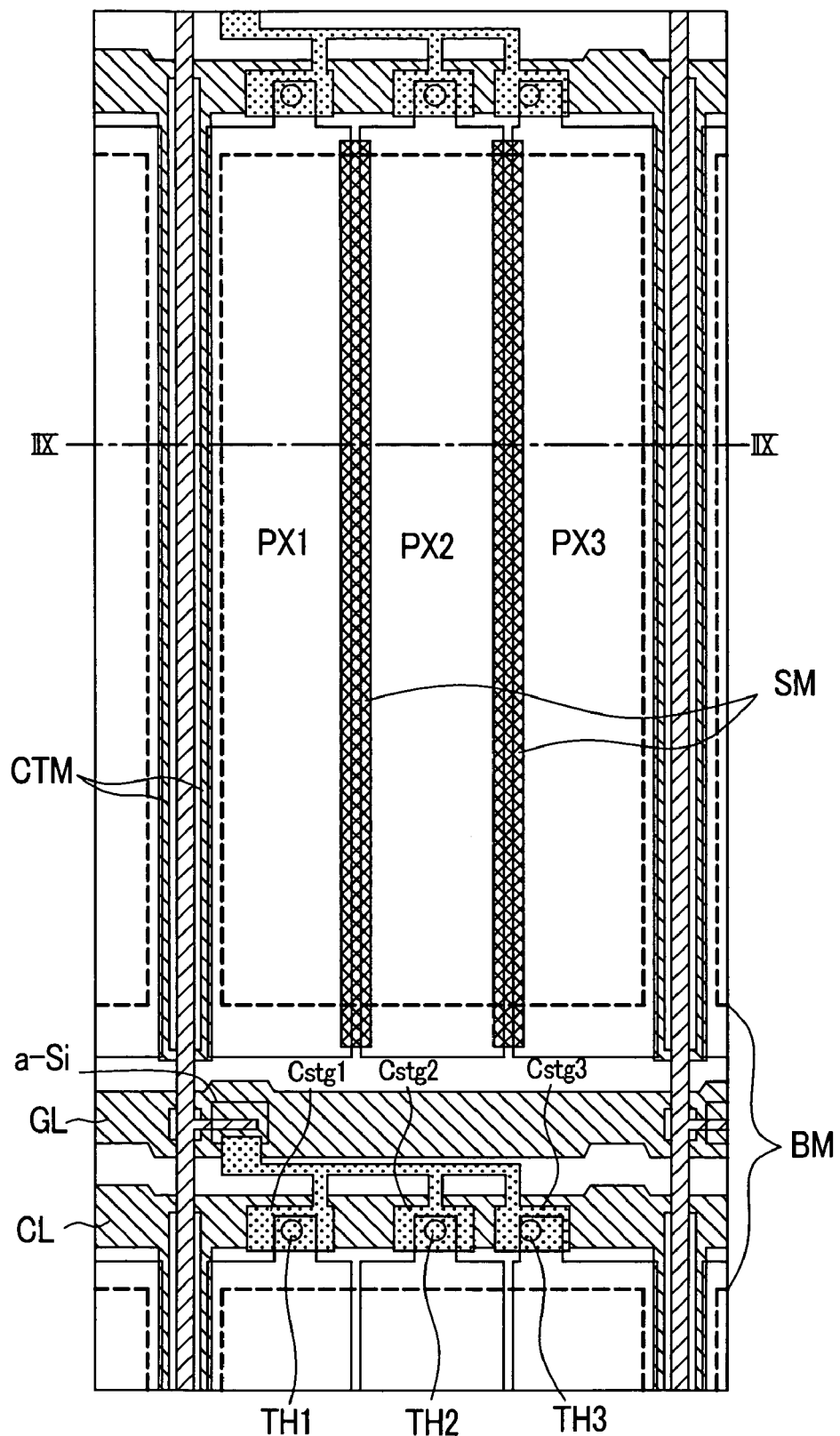
FIG. 19 is a plan view showing another embodiment of a pixel of a display device according to the invention.

FIG. 19 is a plan view showing another embodiment of the liquid crystal display device according to the invention and corresponds to FIG. 17.

The constitution which makes this embodiment different from the embodiment shown in FIG. 17 lies in that, along with the formation of the pixel electrodes PX1, PX2, PX3 respectively in the respective regions defined in one pixel region, light shielding layers SM are respectively formed over a separated portion between the pixel electrodes PX1 and PX2 and a separated portion between the pixel electrodes PX2 and PX3 so that so-called domains generated in these portions cannot be observed with naked eyes.

Accordingly, to enable the light shielding layers SM to sufficiently cover the separated portions of the respective electrodes PX, both of left and right sides of the light shielding layer SM with respect to the extension direction have sufficient widths so that both sides of the light shielding layer SM can be overlapped with the sides of the separated respective pixel electrodes PX.

Figure 20A:
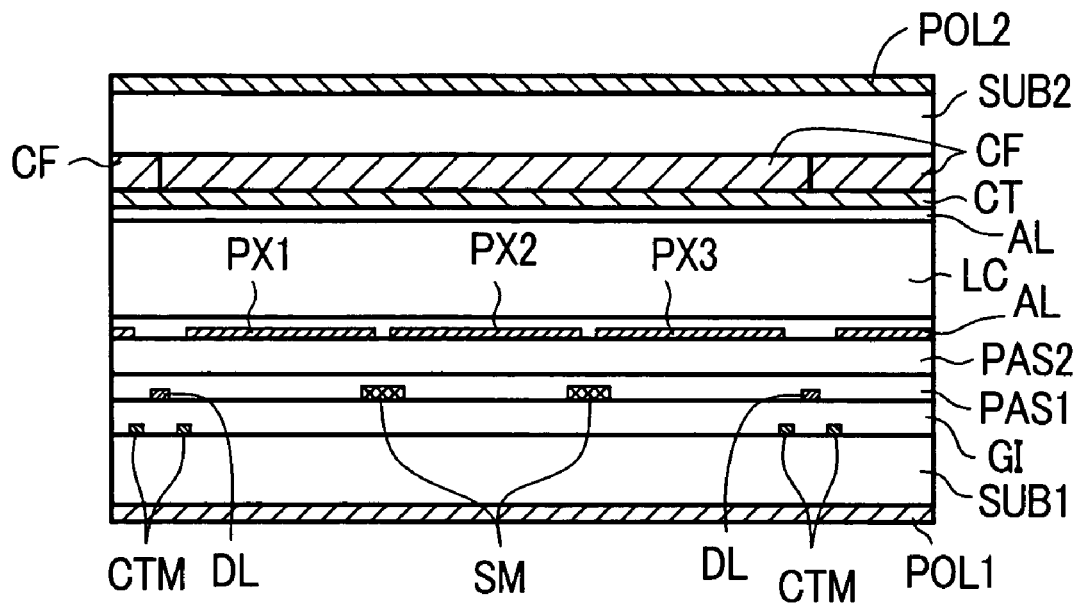
FIGS. 20A and 20B are examples of cross-sectional view taken along a line IIX—IIX in FIG. 19.

As shown in FIG. 20A which is a cross-sectional view taken along a line IIX—IIX in FIG. 19, the above-mentioned light shielding layers SM may be formed over the same layer as the drain signal line DL, that is, over the upper surface of a first insulation film GI, for example, at the transparent substrate SUB1 side. The light shielding layer SM may be formed of the same material as the drain signal line DL.

Figure 20B:
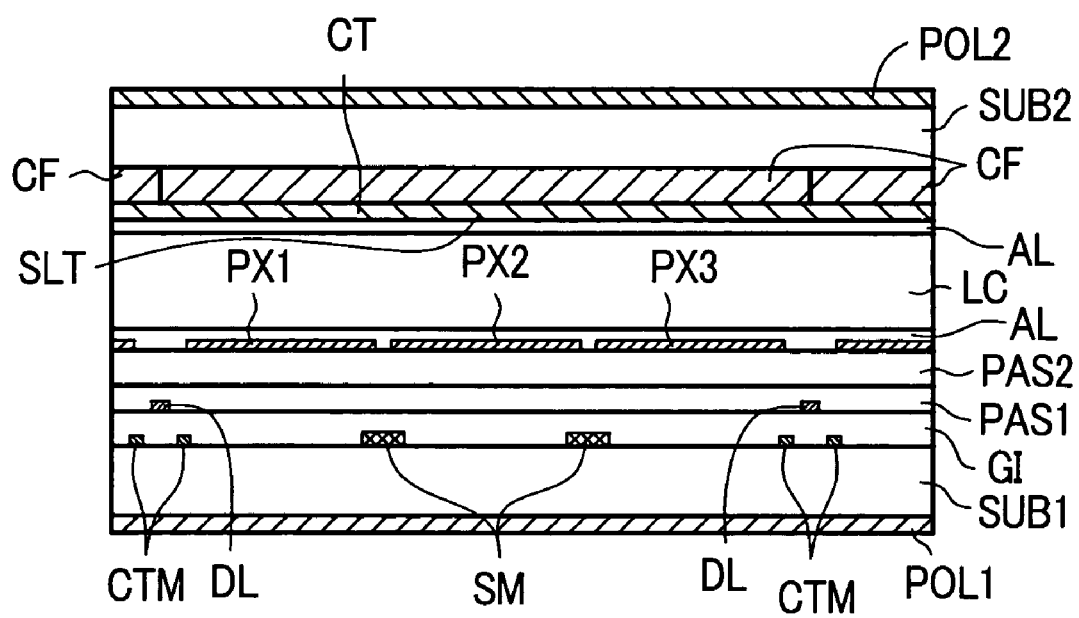

Further, as another embodiment, as shown in FIG. 20B which corresponds to FIG. 20A, also at the transparent substrate SUB1 side, the above-mentioned light shielding layer SM may be formed over the same layer as the gate signal line GL, that is, over the upper surface of the transparent substrate SUB1. The light shielding layer SM may be formed of the same material as the gate signal line GL.

Embodiment 15

Figure 21A:
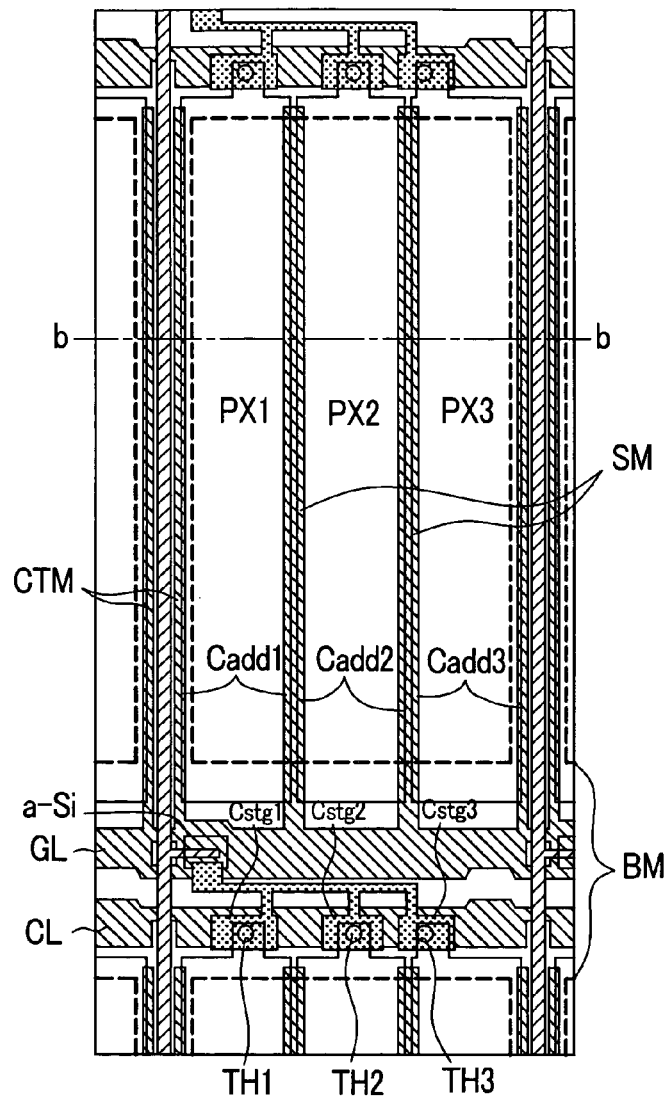

FIG. 21A is a plan view showing another embodiment of the liquid crystal display device according to the invention and corresponds to FIG. 19. Here, FIG. 21B shows a cross-sectional view taken along a line b—b in FIG. 21A.

The constitution which makes this embodiment different from the embodiment shown in FIG. 19 lies in that the light shielding film SM formed over the separated portion between the pixel electrodes PX1 and PX2 and the light shielding film SM formed over the separated portion between the pixel electrodes PX2 and PX3 are formed over the same layer as the scanning signal line GL, that is, over the upper surface of the transparent substrate SUB1 and, further, the light shielding films SM are formed such that the light shielding films SM are electrically connected with the scanning signal lines GL.

Due to such a constitution, over the overlapped portions of respective pixel electrodes PX with the light shielding films SM at the separated portions of the respective pixel electrodes PX, capacitive elements Cadd1, Cadd2, Cadd3 which are constituted of a second protective film PAS2, a first protective film PAS1, a first insulation film GI as dielectric films can be formed. Accordingly, it is possible to obtain an advantageous effect that capacitance of the capacitive elements can be increased together with other capacitive elements Cstg1, Cstg2, Cstg3.

Figure 21B:
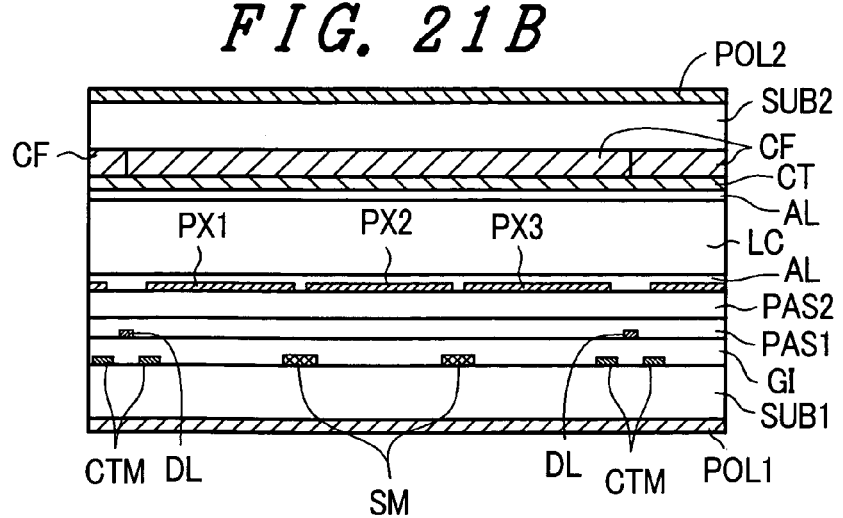
Figure 22:
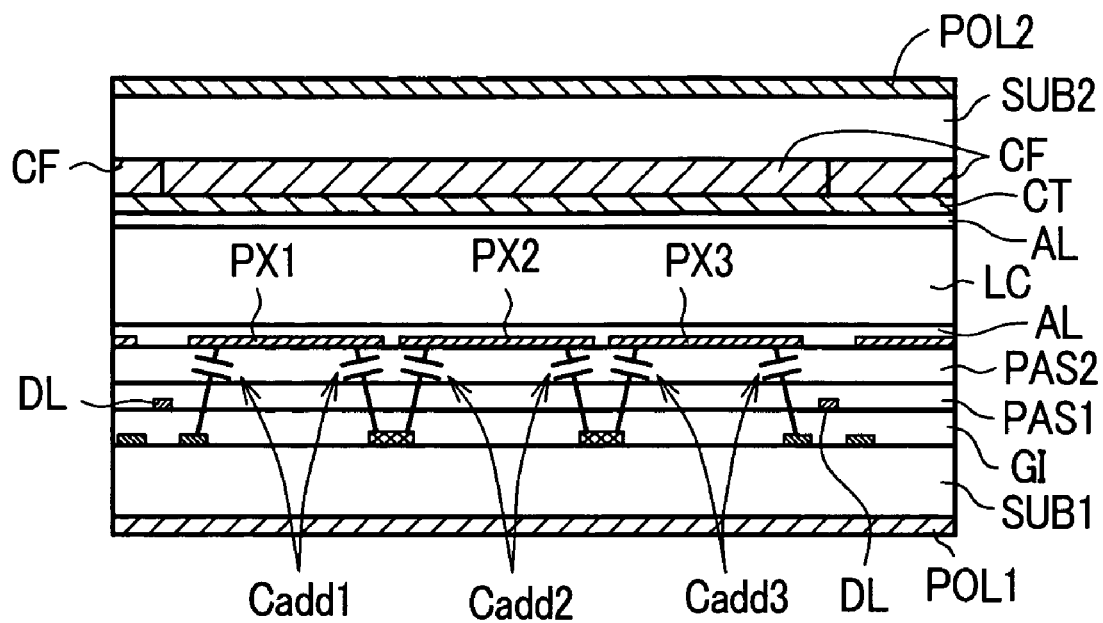
FIG. 22 is a view showing a state that a capacitive element is formed in the constitution shown in FIG. 21 in a cross section.

Here, FIG. 22 corresponds to FIG. 21B and shows that the capacitive elements Cadd are formed between the light shielding films SM and the respective pixel electrodes PX in a cross section.

Here, instead of connecting the light shielding films SM with the scanning signal lines GL, the light shielding films SM may be connected with the capacitive signal line CL. In this case, the capacitance of the capacitive elements Cstg as the capacitive elements Cstg1, Cstg2, Cstg3 can be increased.

Embodiment 16

Figure 23:
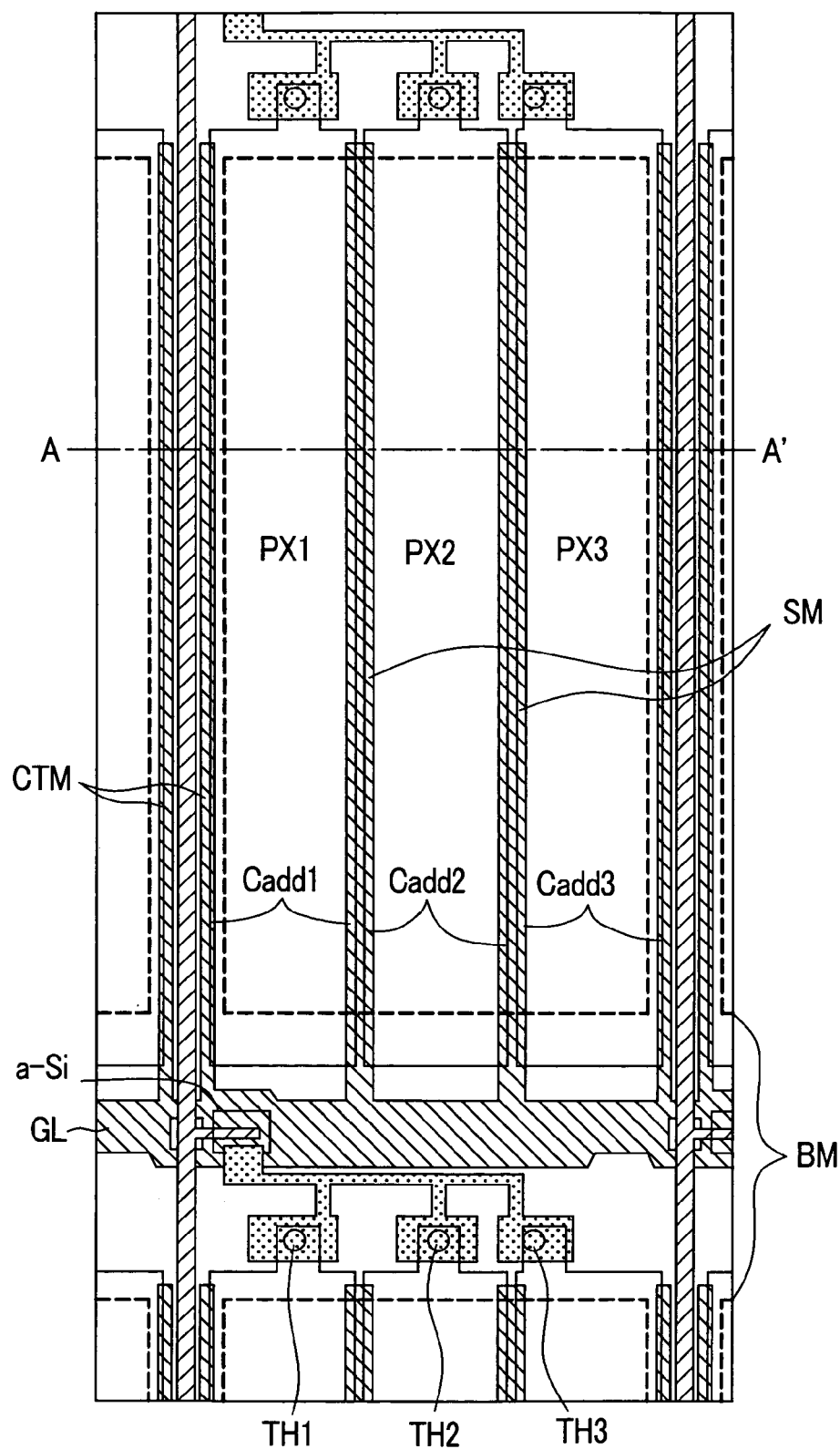
FIG. 23 is a plan view showing another embodiment of a pixel of a display device according to the invention.

FIG. 23 is a plan view showing another embodiment of the liquid crystal display device according to the invention and corresponds to FIG. 21A.

The constitution which makes this embodiment different from the embodiment shown in FIG. 21A lies in that, first of all, the light shielding film SM formed over the separated portion between the pixel electrodes PX1 and PX2 is formed over the same layer as the gate signal line GL, that is, over the upper surface of the transparent substrate SUB1 and is formed such that the light shielding film SM is electrically connected with the gate signal line GL. Further, the liquid crystal display device of this embodiment is not provided with the capacitive signal line CL.

This embodiment is applicable to a case that the capacitive elements Cadd1, Cadd2, Cadd3 which are formed over the overlapped portions of the respective pixel electrodes PX with the light shielding film SL at separated portions are sufficient as the capacitive elements formed over the respective pixel regions. Accordingly, the constitution of this embodiment does not specifically require the provision of the capacitive elements Cstg1, Cstg2, Cstg3 which are formed between the pixel electrodes PX and the capacitive signal line CL.

Further, due to such a constitution, this embodiment does not require any capacitive signal line CL and hence, areas of the respective pixels can be increased.

Embodiment 17

Figure 24:
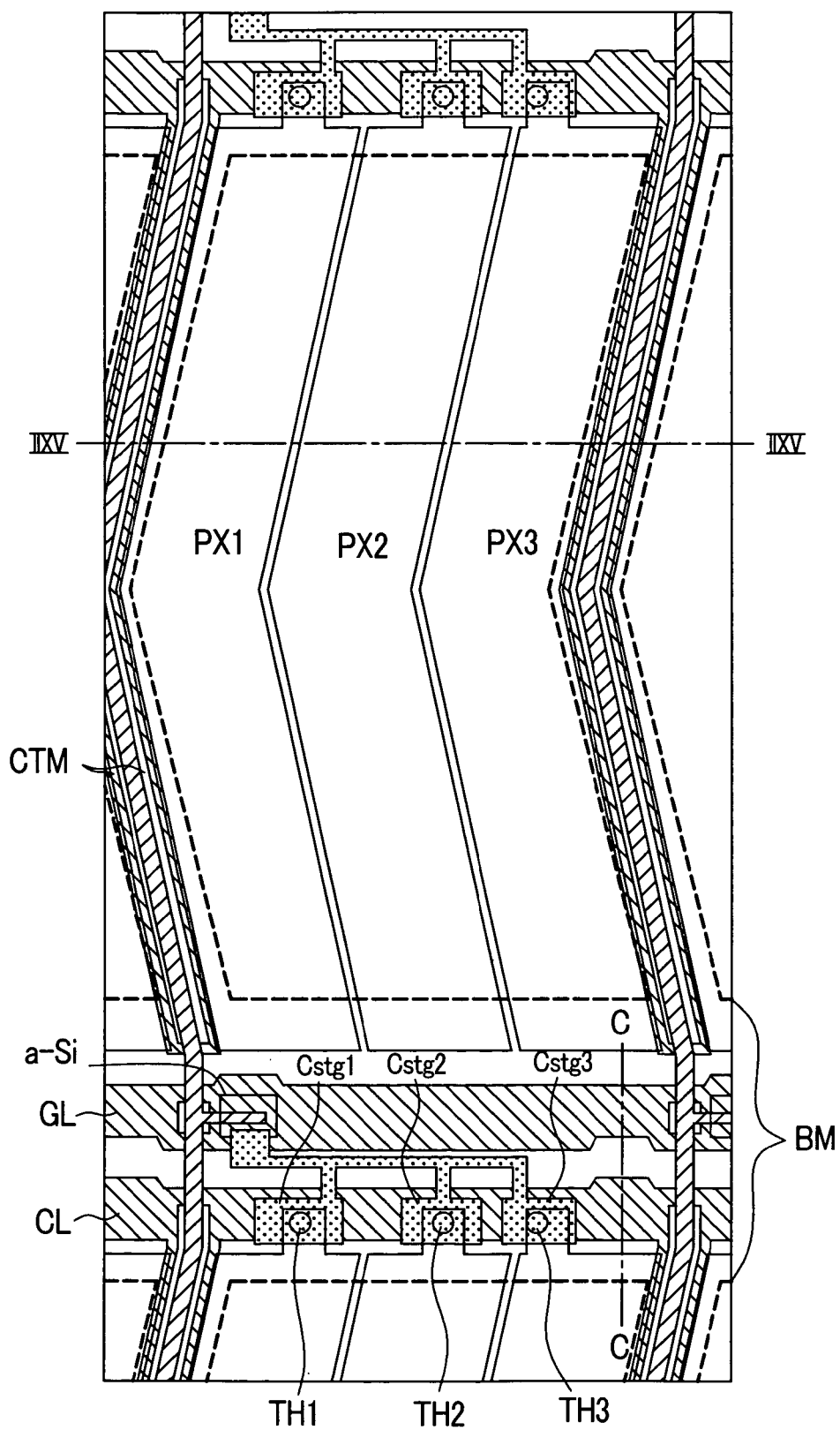
FIG. 24 is a plan view showing another embodiment of a pixel of a display device according to the invention.

FIG. 24 is a plan view showing another embodiment of the liquid crystal display device according to the invention and corresponds to FIG. 17. Further, a cross-sectional view taken along a line IIXV—IIXV in FIG. 24 is shown in FIG. 25.

The constitution which makes this embodiment different from the embodiment shown in FIG. 17 lies in that, the respective pixel electrodes PX1, PX2, PX3 have a pattern in which the respective pixels have center portions thereof bent thus forming a substantially L-shape.

Following the constitution of the pixel electrodes PX1, PX2, PX3, the drain signal lines DL which are arranged close to the pixel electrodes PX1, PX3 also have a pattern in which the drain signal lines DL have center portions thereof bent thus forming a substantially L-shape.

Also in this case, in the same manner as the embodiment shown in FIG. 17, between the respective pixel electrodes PX1, PX2, PX3 and the thin film transistor TFT, the capacitive signal line CL which is arranged close to and in parallel to the gate signal lines GL which drive the thin film transistor TFT is formed. Further, the capacitive elements Cstg1, Cstg2, Cstg3 are formed for respective divided regions of the pixel region over the capacitive signal line CL.

That is, one video signal which is branched from the source electrode ST of the thin transistor TFT via the above-mentioned path is supplied to the pixel electrode PX1 and, at the same time, the video signal is stored in the capacitive element Cstg1. Another one video signal is supplied to the pixel electrode PX2 and, at the same time, the video signal is stored in the capacitive element Cstg2. Further, remaining other video signal is supplied to the pixel electrode PX3 and, at the same time, the video signal is stored in the capacitive element Cstg3.

Figure 25A:
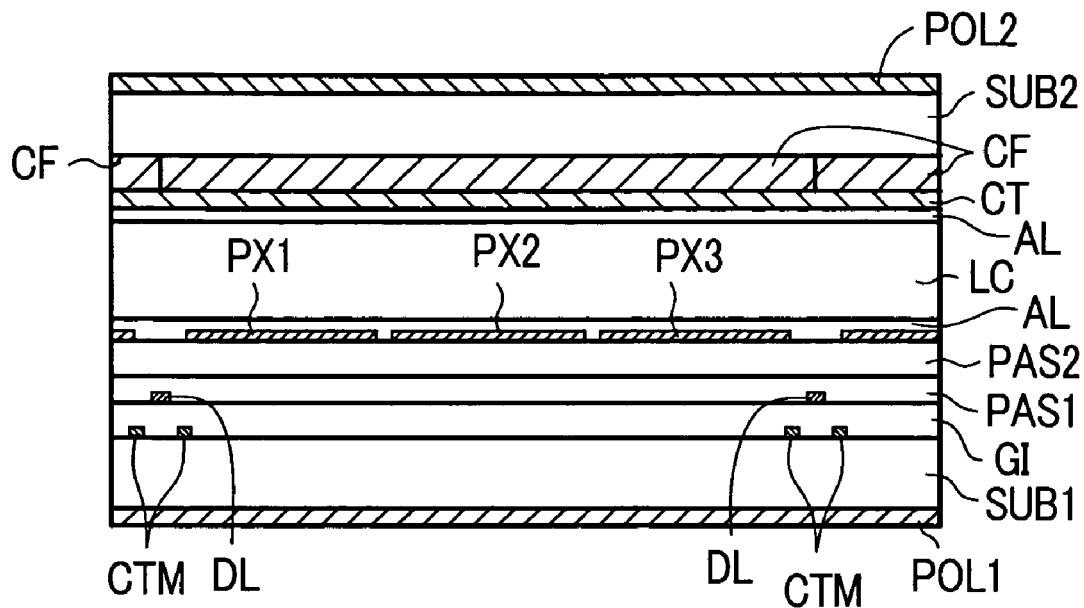
FIGS. 25A and 25B are examples of cross-sectional view taken along a line IIXV—IIXV in FIG. 24.
Figure 25B:
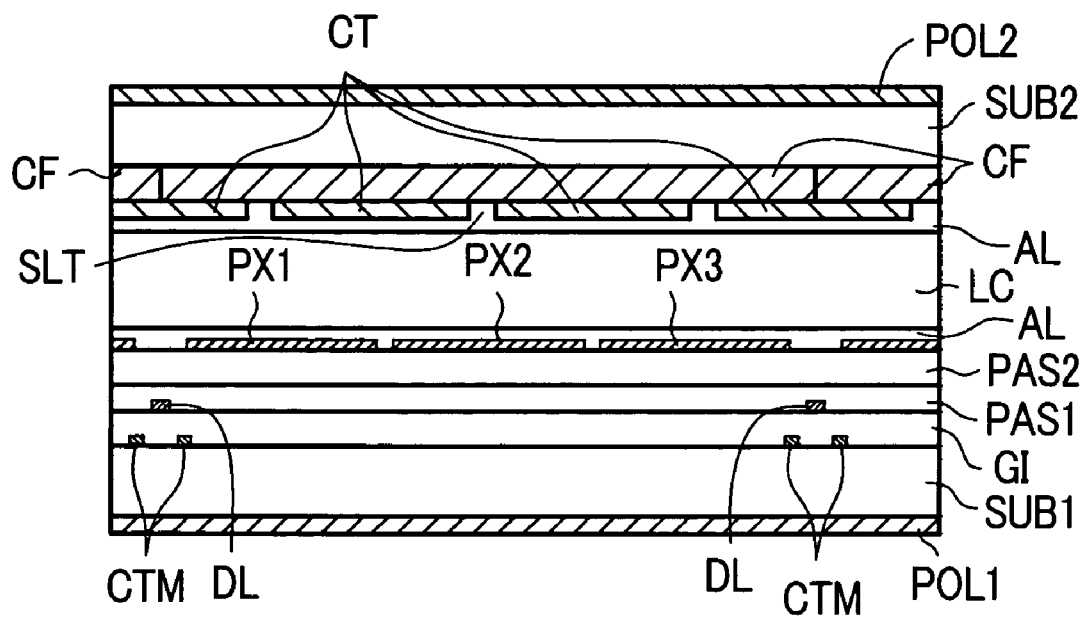

Also in this case, as shown in FIG. 25A, the counter electrode CT formed over the transparent substrate SUB2 side may be constituted such that a conductive layer is formed over the whole surface in common with respect to the respective pixels. Further, as shown in FIG. 25B, slits SLT, for example, are formed in the counter electrode CT, wherein these slits SLT are arranged to face the substantially centers of the respective pixel electrodes PX1, PX2, PX3 and to extend in the y direction. It is needless to say that the slits SLT have bent portions in this case.

Embodiment 18

Figure 26:
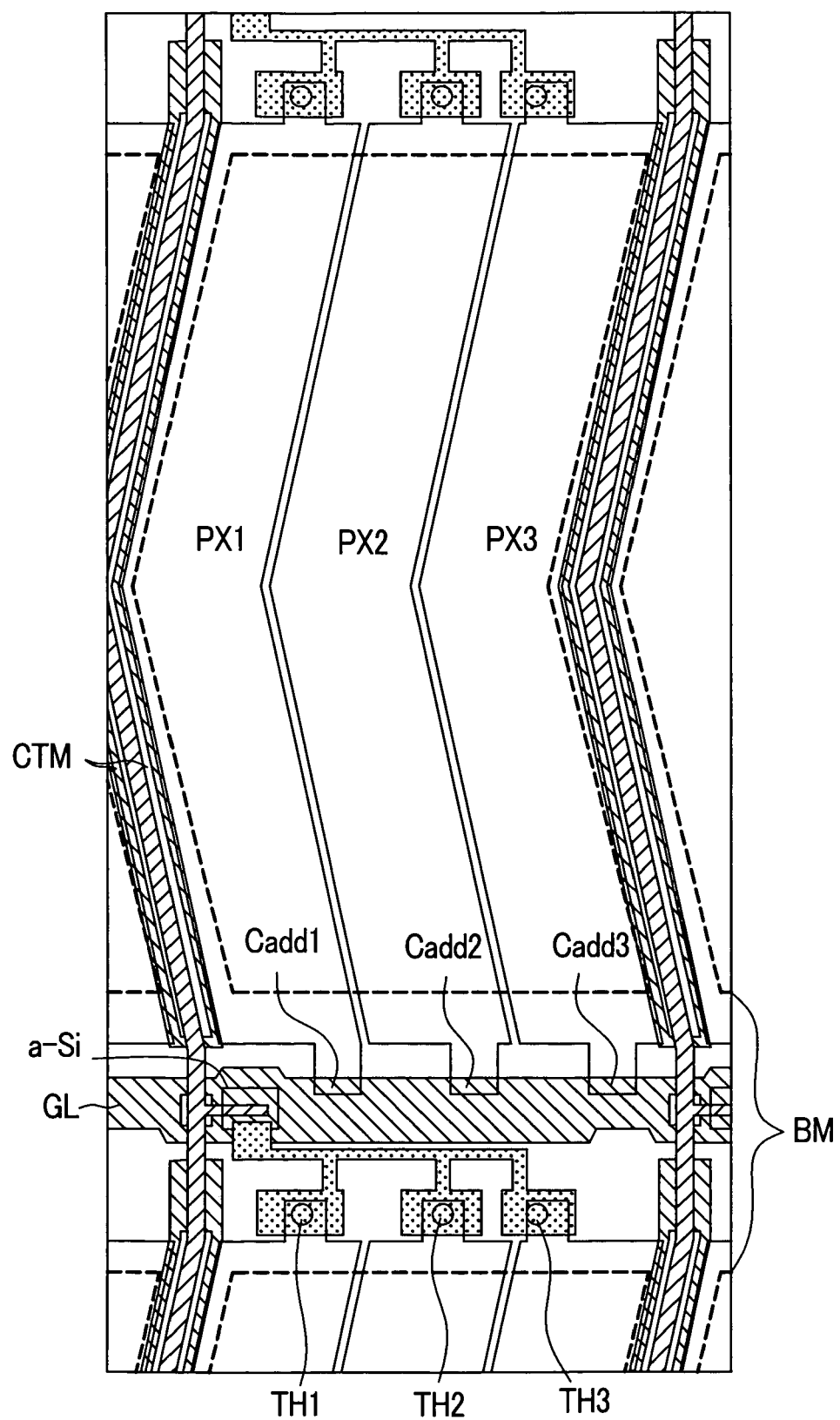
FIG. 26 is a plan view showing another embodiment of a pixel of a display device according to the invention.

FIG. 26 is a plan view showing another embodiment of the liquid crystal display device according to the invention and corresponds to FIG. 24.

The constitution which makes this embodiment different from the embodiment shown in FIG. 24 lies in that, first of all, no capacitive signal line CL is provided. Further, the respective one end portions of the respective pixel electrodes PX1, PX2, PX3 are extended to be overlapped with the gate signal line GL and the respective capacitive elements Cadd1, Cadd2, Cadd3 are constituted at the overlapped portion.

Here, in this constitution, the counter electrode CT arranged at the transparent substrate SUB2 side is formed in the substantially same pattern as the respective pixel electrodes PX1, PX2, PX3 and is arranged such that the counter electrode CT is shifted in the x direction by a half pitch with respect to the pixel electrode PX. Due to such a constitution, it is possible to prevent the generation of so-called domains at the separated portions of the respective pixel electrodes PX.

Further, the regions where the capacitive elements Cadd1, Cadd2, Cadd3 are formed are covered with the black matrix BM. In other words, the capacitive elements Cadd1, Cadd2, Cadd3 are formed below the black matrix BM and hence, the so-called numerical aperture of the pixel can be enhanced.

The above-mentioned respective embodiments may be used in a single form or in combination. This is because that the advantageous effects of respective embodiments can be obtained in a single form or synergistically.

Further, it is needless to say that the invention which can reduce the point defects is applicable to the display device other than the liquid crystal display device such as an organic display device, an organic EL display device or the like.

As can be clearly understood from the foregoing explanation, the display device according to the invention has the advantage that it is possible to prevent the drawback attributed to the black display which is performed for repairing the point defects.

What is claimed is:

1. A liquid crystal display device in which each pixel region formed over a liquid crystal side of one substrate out of respective substrates which are arranged to face each other with liquid crystal therebetween includes a pixel electrode to which a video signal is supplied from a drain signal line through a switching element driven in response to a scanning signal from a gate signal line and a capacitive element which is formed between the pixel electrode and a capacitive signal line by way of a dielectric film, wherein the pixel region is divided into a plurality of sections, each section includes a part of the pixel electrode, the respective part of the pixel electrode in the respective section and the switching element are connected to each other through a connection path which is connected to the switching element and has a plurality of branched paths, and the connecting path is arranged in an area between the gate signal line and the capacitive signal line of the pixel region in a plan view, and the area is arranged under a black matrix.

2. A liquid crystal display device according to claim 1, wherein respective paths which are branched from the switching element have portions thereof overlapped with only an insulation film.

3. A liquid crystal display device according to claim 1, wherein the capacitive element is formed over a capacitive signal line in an overlapped manner and the capacitive signal line constitutes one electrode of the capacitive element.

4. A liquid crystal display device according to claim 1, wherein the pixel electrode is constituted of a group formed of a plurality of strip-like electrodes which extend in one direction and, at the same time, a counter electrode which generates an electric field between the counter electrode and each pixel electrode is constituted of a group formed of a plurality of strip-like electrodes which are arranged with each pixel electrode therebetween and extend in one direction at one substrate side.

5. A liquid crystal display device in which each pixel region formed over a liquid crystal side of one substrate out of respective substrates which are arranged to face each other with liquid crystal therebetween includes a pixel electrode to which a video signal is supplied from a drain signal line through a switching element driven in response to a scanning signal from a gate signal line and a capacitive element which corresponds to the pixel electrode, wherein the pixel electrode is divided into a plurality of divided pixel electrodes, the capacitive element is provided for each divided pixel electrode, and the pixel electrode and the switching element are connected to each other through a connecting path which is connected to the switching element and has a plurality of branched paths, and the connecting path is arranged in an area between the gate signal line and the capacitive signal line of the pixel region in a plan view, and the area is arranged under a black matrix.

6. A liquid crystal display device according to claim 5, wherein a light shielding film which blocks divided portions of the respective divided pixel electrodes is formed over one substrate side.

7. A liquid crystal display device according to claim 1, wherein the liquid crystal display device is a normally black type liquid crystal display device.

8. A liquid crystal display device according to claim 7, wherein the display device includes the structure in which upon cutting the branched paths, the switching element and the pixel electrode are separated from each other and, at the same time, the capacitive element and the switching element are separated from each other.

9. A liquid crystal display device according to claim 5, wherein the liquid crystal display device is a normally black type liquid crystal display device.

10. A liquid crystal display device according to claim 9, wherein the display device includes the structure in which upon cutting the branched paths, the switching element and the pixel electrode are separated from each other and, at the same time, the capacitive element and the switching element are separated from each other.

* * * * *